(12) United States Patent
Tao et al.

(10) Patent No.: US 12,119,647 B2
(45) Date of Patent: Oct. 15, 2024

(54) INTELLIGENT ALGORITHM FOR MAXIMUM POWER POINT TRACKING THROUGH LOAD MANAGEMENT IN SOLAR PHOTOVOLTAIC SYSTEMS

(71) Applicants: Meng Tao, Fountain Hills, AZ (US); Kelvin Tan, Tempe, AZ (US); Joseph Azzolini, Tempe, AZ (US)

(72) Inventors: Meng Tao, Fountain Hills, AZ (US); Kelvin Tan, Tempe, AZ (US); Joseph Azzolini, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 35 days.

(21) Appl. No.: 18/322,860

(22) Filed: May 24, 2023

(65) Prior Publication Data
US 2023/0387690 A1    Nov. 30, 2023

Related U.S. Application Data

(60) Provisional application No. 63/346,169, filed on May 26, 2022.

(51) Int. Cl.
*H02J 3/14*     (2006.01)
*G05F 1/67*     (2006.01)

(52) U.S. Cl.
CPC ............... *H02J 3/14* (2013.01); *G05F 1/67* (2013.01); *H02J 2300/26* (2020.01)

(58) Field of Classification Search
CPC ............ H02J 3/14; H02J 2300/26; G05F 1/67
USPC ........................................................ 307/39
See application file for complete search history.

(56) References Cited

U.S. PATENT DOCUMENTS

| | | |
|---|---|---|
| 4,511,807 A | 4/1985 | Somerville |
| 4,571,532 A | 2/1986 | Jaster |
| 5,293,447 A | 3/1994 | Fanney et al. |
| 5,635,816 A | 6/1997 | Welsh et al. |
| 6,037,758 A | 3/2000 | Perez |
| 6,624,350 B2 | 9/2003 | Nixon |
| 6,889,122 B2 | 5/2005 | Perez |
| 10,399,441 B2 | 9/2019 | Tao |
| 10,840,735 B1 | 11/2020 | Cooper |
| 2010/0017045 A1 | 1/2010 | Nesler et al. |
| 2010/0207448 A1 | 8/2010 | Cooper et al. |
| 2010/0264732 A1 | 10/2010 | Beck |
| 2014/0265573 A1 | 9/2014 | Kreutzman |
| 2016/0376712 A1 | 12/2016 | Ono et al. |
| 2022/0190598 A1 | 6/2022 | Asu |

OTHER PUBLICATIONS

Azzolini, J. A., et al., "A Control Strategy for Improved Efficiency in Direct-Coupled Photovoltaic Systems through Load Management," Applied Energy, vol. 231, p. 926-936. 2018.

(Continued)

*Primary Examiner* — Daniel Kessie
*Assistant Examiner* — Dru M Parries
(74) *Attorney, Agent, or Firm* — Snell & Wilmer L.L.P.

(57) ABSTRACT

Principles of the present disclosure present an advanced control algorithm related to improving maximum power point tracking of a renewable energy system such as a solar photovoltaic system through load management, which estimates optimum load switch points, minimizes unsuccessful switches, and maximizes renewable energy such as photovoltaic energy delivered to loads.

20 Claims, 29 Drawing Sheets

(56) References Cited

OTHER PUBLICATIONS

Tan, K., et al., "Algorithms for Maximum Power Point Tracking through Load Management," 48th IEEE Photovoltaic Specialist Conference. 2021. pp. 1773-1778.
Tan, K. et al., "An Intelligent Algorithm for Maximum Power Point Tracking in PV Systems through Load Management," 49th IEEE Photovoltaic Specialists Conference. 2022.
USPTO, Notice of Allowance, dated May 2, 2019 in U.S. Appl. No. 15/350,171.
USPTO, Final Office Action, dated Feb. 7, 2019 in U.S. Appl. No. 15/350,171.
USPTO, Non-Final Office Action dated Jun. 15, 2018 in U.S. Appl. No. 15/350,171.
USPTO, Notice of Allowance dated Jan. 26, 2023 in U.S. Appl. No. 17/552,782.
Mendis, N. et al., Autonomous Operation of Wind-Battery Hybrid Power System with Maximum Power Extraction Capability, International Conference on Power System Technology (Powercon) pp. 1-7. 2010.
Balog, R.S. et al., Autonomous Local Control in Distributed DC Power Systems, Dissertation, Department of Electrical and Computer Engineering, University of Illinois at Urbana-Champaign. 2006.
Samrat, N. H. et al., Technical Study of a Standalone Photovoltaic-Wind Energy Based Hybrid Power Supply Systems for Island Electrification in Malaysia, PLOS ONE, Jun. 29, 2015, 10(6): e0130678.
Faxas-Guzman, J. et al., Priority load control algorithm for optimal energy management in stand-alone photovoltaic systems, Jan. 26, 2014, vol. 68, pp. 156-162, 0960-1481, Renewable Energy 2014.
Hansen, A.D. et al., Models for a Stand-Alone PV system, Denmark. Technical University of Denmark. Forskningscenter Risoe. Risoe-R, No. 1219(EN), 0106-2840, 2001.
Azzolini, J. A., "Development of a load-managing photovoltaic system topology," Ph.D. dissertation, Arizona State University. 2020.
Azzolini, J. A. et al., "Maximum power point tracking through load management," U.S. Appl. No. 63/126,053. 2020.
Blair, N. et al., "System Advisor Model {SAM} general description {Version 2017.9.5}," National Renewable Energy Laboratory. 2018.
Azzolini, J.A. et al., "A Load-Managing Photovoltaic System for Electric Vehicle Charging", Arizona State University.
Roston, E. Electric cars can help clean up the grid—Electricity needs to come from renewable sources in order to arrest climate change, https://www.bloomberg.com/news/articles/2016-04-29/electric-cars-canhelp-lean-up-the-grid.
International Energy Agency, Global EV Outlook 2016—Beyond One Million Electric Cars. 2016.
Stein, J. S. et al., "PV LIB Toolbox (version 1.1)," Sandia National Laboratories. 2014.
Chung, D. et al., "U.S. Photovoltaic Prices and Cost Breakdowns: Q1 2015 Benchmarks for Residential, Commercial, and Utility-Scale Systems," National Renewable Energy Laboratory. (2015) http://www.nrel.gov/docs/fy15osli/64746.pdf.
Singh, G. K. Solar power generation by PV (photovoltaic) technology: a review. Energy. [Online]. 53, pp. 1-13. May 2013, https://doi.org/10.1016/j.energy.2013.02.057.
Salam, Z. et al., The application of soft computing methods for MPPT of PV system: A technological and status review. Applied Energy. [Online]. 107, pp. 135-148. Jul. 2013, https://doi.org/10.1016/j.apenergy.2013.02.008.
D'souza, N. S. et al., Comparative study of variable size perturbation and observation maximum power point trackers for PV systems. Electric Power Systems Research. [Online]. 80(3), pp. 296-305. Mar. 2010, https://doi.org/10.1016/j.epsr.2009.09.012.
Elgendy, M. A. et al., Assessment of perturb and observe MPPT algorithm implementation techniques for PV pumping applications. IEEE Trans. Sustain. Energy. [Online]. 3(1), pp. 22-33. Jan. 2012, https://doi.org/10.1016/j.epsr.2009.09.012.
Elgendy, M.A. et al., Assessment of the incremental conductance maximum power point tracking algorithm. IEEE Trans. Sustain. Energy. [Online]. 4(1), pp. 108-117. Jan. 2013, https://doi.org/10.1109/TSTE.2012.2202698.
Safari, A. et al., Simulation and hardware implementation of incremental conductance MPPT with direct control method using cuk converter. IEEE Trans. Ind. Electron. [Online]. 58(4), pp. 1154-1161. Apr. 2011, https://doi. org/10.1109/TIE.2010.2048834.
Ahmad, J. A. fractional open circuit voltage based maximum power point tracker for photovoltaic arrays. 2010 2nd Int. Conf. Soft. Tech. Eng. [Online]. 1, pp. 247-250. 2010. https://doi.org/10.1109/ICSTE.2010.5608868.
Chiu, C. S. T-S fuzzy maximum power point tracking control of solar power generation systems. IEEE Trans. Energy Convers. [Online]. 25(4), pp. 1123-1132. Dec. 2010, https://doi.org/10.1109/TEC.2010.2041551.
Koad, R. B. A. et al., A novel MPPT algorithm based on particle swarm optimization for photovoltaic systems. IEEE Trans. Sustain. Energy. [Online]. 8(2), pp. 468-476. Apr. 2017, https://doi.org/10.1109/TSTE.2016.2606421.
Dunman, S. et al., A novel MPPT algorithm based on optimized artificial neural network by using FPSOGSA for standalone photovoltaic energy systems. Neural Comp. Appl. [Online]. 29, pp. 257-278. 2018. https://doi.org/10.1007/s00521-016-2447-9.
Syafaruddin et al., Artificial neural network-polar coordinated fuzzy controller based maximum power point tracking control under partially shaded conditions. IET Renewable Power Gener. [Online]. 3(2), pp. 239-253. Jun. 2009, https://www.proquest.com/scholarly-journals/artificial-neural-network-polar-coordinated-fuzzy/docview/1635064638/se-2.
Sundareswaran, K. et al., Enhanced energy output from a PV system under partial shaded conditions through artificial bee colony. IEEE Trans. Sustain. Energy. [Online]. 6(1), pp. 198-209. Jan. 2015, https://doi.org/10.1109/TSTE.2014.2363521.
Bechouat, M. et al., Energy storage based on maximum power point tracking in photovoltaic systems: A comparison between GAS and PSO approaches. Int. J. Hydrogen Energy. [Online]. 40(39), pp. 13737-13748. Oct. 2015, https://doi.org/10.1016/j.ijhydene.2015.05.008.
Dawidziuk, J. Review and comparison of high efficiency high power boost DC/DC converters for photovoltaic applications. Bulletin Polish Academy Sciences. [Online]. 59(4), pp. 499-506. 2011. https://doi.org/10.2478/v10175-011-0061-7.
Polo, C. R. et al., "Dynamic simulation of a load-matching photovoltaic system for green hydrogen production," presented at 2022 IEEE 49th Photovolt. Spec. Conf., Philadelphia, Pennsylvania, Jun. 5-10, 2022.
Graditi, G. et al., "Efficiency and reliability comparison of DCDC converters for single phase grid connected photovoltaic inverters," in SPEEDAM 2010, 2010, pp. 140-147.
Ramasamy, V. et al., U.S. solar photovoltaic system and energy storage cost benchmarks: Q1 2021. [Online]. Nov. 2021, https://www.nrel.gov/docs/fy22osti/80694.pdf.
Blair, N. J. et al., Comparison of photovoltaic models in the system advisor model. Presented at Solar 2013/ [Online]. Apr. 2013, https://www.nrel.gov/docs/fy13osti/58057.pdf.
Winston, D. P. et al., Performance improvement of solar PV array topologies during various partial shading conditions. Solar Energy. [Online]. 196, pp. 228-242. Jan. 2020, https://doi.org/10.1016/j.solener.2019.12.007.
Xu, L. et al., A modified INC method for PV string under uniform irradiance and partially shaded conditions. IEEE Access. [Online]. 8, pp. 131340-131351. Jul. 2020, https://doi.org/10.1109/ACCESS.2020.3009668.
Samani, L. et al., Maximum power point tracking for photovoltaic systems under partial shading conditions via modifed model predictive control. Electr. Eng. [Online]. 103, pp. 1923-1947. Feb. 2021, https://doi.org/10.1007/s00202-020-01201-5.
Ahmed, J. et al., An enhanced adaptive P&O Mppt for fast and efficient tracking under varying environmental conditions. IEEE Trans Sustain. Energy. [Online]. 9(3), pp. 1487-1496. Jul. 2018, https://doi.org/10.1109/TSTE.2018.2791968.

(56) References Cited

OTHER PUBLICATIONS

Tan, K., et al., A predictive algorithm for maximum power point tracking in solar photovoltaic systems through load management. Solar Energy, 265, 112127. 2023.

INTELLIGENT ALGORITHM FOR MAXIMUM POWER POINT TRACKING THROUGH LOAD MANAGEMENT IN SOLAR PHOTOVOLTAIC SYSTEMS

CROSS-REFERENCE TO RELATED APPLICATIONS

This application is a non-provisional of, and claims priority to and the benefit of U.S. Provisional Application No. 63/346,169, entitled "INTELLIGENT ALGORITHM FOR MAXIMUM POWER POINT TRACKING THROUGH LOAD MANAGEMENT IN SOLAR PHOTOVOLTAIC SYSTEMS," filed on May 26, 2022. The disclosure of the foregoing application is incorporated herein by reference in its entirety, including but not limited to those portions that specifically appear hereinafter, but except for any subject matter disclaimers or disavowals, and except to the extent that the incorporated material is inconsistent with the express disclosure herein, in which case the language in this disclosure shall control.

TECHNICAL FIELD

The present disclosure relates to renewable energy systems such as solar power systems, and in particular to intelligent control of loads driven by renewable energy (e.g., solar power).

BACKGROUND

In conventional solar photovoltaic systems, intermittent power from a photovoltaic array is managed or conditioned to extract the maximum available photovoltaic power from the array and deliver it to a load. A maximum power point tracker is designed for this purpose, which is often incorporated into a power converter for such a system, such as direct-current to alternating-current (DC/AC) inverter or direct-current to direct-current (DC/DC) converter. Each time the power is managed or conditioned, there is a power loss associated with it. There is also a monetary cost for the power converter. In addition, scalability of a solar photovoltaic system is limited by a power rating of the power converter. Accordingly, an improved control strategy is desired for these systems and related methods.

SUMMARY

In various embodiments, systems, methods, and articles of manufacture (collectively, the "system") for intelligent load management for a solar photovoltaic (PV) system are disclosed. In various embodiments, the system may include a PV array of solar modules; a plurality of loads configured to be powered by the PV array and switched on or off by a plurality of respective relays; a power sensor configured to measure an amount of power delivered from the PV array to the plurality of loads; and a controller coupled to the power sensor and the plurality of relays and configured to: determine, by the power sensor, a first power output and a second power output of the PV array at, respectively, a first time and a second time which is later than the first time by a first delay period; compare the first and the second power outputs; cause, via a relay and based on the comparison of the first and the second power outputs, a first switch of a load; determine, by the power sensor, a third power output of the PV array at a third time after the first switch of the load and compare the second and the third power outputs; cause, via the relay and based on the comparison of the second and the third power outputs, an undo of the first switch of the load if the second power output is larger than the third power output; determine, by the power sensor, a fourth power output of the PV array at a fourth time after the undo of the first switch of the load and a second delay period; cause, via the relay, a second switch of the load; determine, by the power sensor, a fifth power output of the PV array at a fifth time after the second switch of the load and compare the fourth and the fifth power outputs; cause, via the relay and based on the comparison of the fourth and the fifth power outputs, an undo of the second switch of the load if the fourth power output is larger than the fifth power output; determine a first rate of change of power output between the second and the fourth power outputs and a second rate of change of power output between the third and the fifth power outputs; predict, based on the first and the second rates of change of power output, a power output level of the PV array at a sixth time corresponding to an optimal power level for a third switch of the load; and cause, via the relay, the third switch of the load when a measured power output level of the PV array equals the predicted power output level.

In various embodiments, the first switch, the second switch, or the third switch of the load may include a connection of the load to the PV array. In various embodiments, the first switch, the second switch, or the third switch of the load may include a disconnection of the load from the PV array. In various embodiments, the first delay period between the first time and the second time and the second delay period between the third time and the fourth time may each be between 1 second and 10 minutes. In various embodiments, the controller may be further configured to prevent, based on the first delay period between the first time and the second time and the second delay period between the third time and the fourth time, a faulty switch of a load caused by noise in solar irradiance data associated with the PV array. In various embodiments, the controller may be further configured to cause, via one or more additional relays, connection of one or more additional loads to the PV array and to handle a peak power output of a gigawatt. In various embodiments, the controller may be further configured for industrial electrolysis, solar energy storage, or electric vehicle charging.

In various embodiments, an intelligent load management apparatus for a solar PV system is disclosed. The apparatus may include: a PV array of solar modules; a plurality of loads configured to be powered by the PV array and switched on or off by a plurality of respective relays; a power sensor configured to measure an amount of power delivered from the PV array to the plurality of loads; and a controller coupled to the power sensor and the plurality of relays and configured to: determine, by the power sensor, a first power output and a second power output of the PV array at, respectively, a first time and a second time which is later than the first time by a first delay period; compare the first and the second power outputs; cause, via a relay and based on the comparison of the first and the second power outputs, a first switch of a load; determine, by the power sensor, a third power output of the PV array at a third time after the first switch of the load and compare the second and the third power outputs; cause, via the relay and based on the comparison of the second and the third power outputs, an undo of the first switch of the load if the second power output is larger than the third power output; determine, by the power sensor, a fourth power output of the PV array at a fourth time after the undo of the first switch of the load and a second delay period; cause, via the relay, a second switch of the load; determine, by the power sensor, a fifth power output of the PV array at a fifth time after the second switch of the load and compare the fourth and the fifth power outputs; cause, via the relay and based on the comparison of the fourth and the fifth power outputs, an undo of the second switch of the load if the fourth power output is larger than the fifth power output; determine a first rate of change of power output between the second and the fourth power outputs and a second rate of change of power output between the third and the fifth power outputs; predict, based on the first and the second rates of change of power output, a power output level of the PV array at a sixth time corresponding to an optimal power level for a third switch of the load; and cause, via the relay, the third switch of the load when a measured power output level of the PV array equals the predicted power output level.

In various embodiments, the first switch, the second switch, or the third switch of the load may include a connection of the load to the PV array. In various embodiments, the first switch, the second switch, or the third switch of the load may include a disconnection of the load from the PV array. In various embodiments, the first delay period between the first time and the second time and the second delay period between the third time and the fourth time may each be between 1 second and 10 minutes. In various embodiments, the controller may be further configured to prevent, based on the first delay period between the first time and the second time and the second delay period between the third time and the fourth time, a faulty switch of a load caused by noise in solar irradiance data associated with the PV array. In various embodiments, the controller may be further configured to cause, via one or more additional relays, connection of one or more additional loads to the PV array and to handle a peak power output of a gigawatt. In various embodiments, the controller may be further configured for industrial electrolysis, solar energy storage, or electric vehicle charging.

In various embodiments, an intelligent load management method for a solar PV system is disclosed. The method may include: determining, by a power sensor, a first power output and a second power output of a PV array of solar modules at, respectively, a first time and a second time which is later than the first time by a first delay period; comparing, by a controller, the first and the second power outputs; causing, via a relay and based on the comparison of the first and the second power outputs, a first switch of a load; determining, by the power sensor, a third power output of the PV array at a third time after the first switch of the load and comparing, by the controller, the second and the third power outputs; causing, via the relay and based on the comparison of the second and the third power outputs, an undo of the first switch of the load based on the second power output being larger than the third power output; determining, by the power sensor, a fourth power output of the PV array at a fourth time after the undo of the first switch of the load and a second delay period; causing, via the relay, a second switch of the load; determining, by the power sensor, a fifth power output of the PV array at a fifth time after the second switch of the load and comparing, by the controller, the fourth and the fifth power outputs; causing, via the relay and based on the comparison of the fourth and the fifth power outputs, an undo of the second switch of the load based on the fourth power output being larger than the fifth power output; determining, by the controller, a first rate of change of power output between the second and the fourth power outputs and a second rate of change of power output between the third and the fifth power outputs; and predicting, by the controller and based on the first and the second rates of change of power output, a power output level of the PV array at a sixth time corresponding to an optimal power level for a third switch of the load.

In various embodiments, the first switch, the second switch, or the third switch of the load may include a connection of the load to the PV array. In various embodiments, the first switch, the second switch, or the third switch of the load may include a disconnection of the load from the PV array. In various embodiments, the first delay period between the first time and the second time and the second delay period between the third time and the fourth time may each be between 1 second and 10 minutes. In various embodiments, the method may further include preventing, by the controller and based on the first delay period between the first time and the second time and the second delay period between the third time and the fourth time, a faulty switch of a load caused by noise in solar irradiance data associated with the PV array. In various embodiments, the method may further include causing, via one or more additional relays, connection of one or more additional loads to the PV array and handling a peak power output of a gigawatt.

This section is intended as a simplified introduction to the disclosure, and is not intended to limit the scope of any claim.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with following illustrative figures. In the following figures, like reference numbers refer to similar elements and steps throughout the figures.

DETAILED DESCRIPTION

Figure 1:
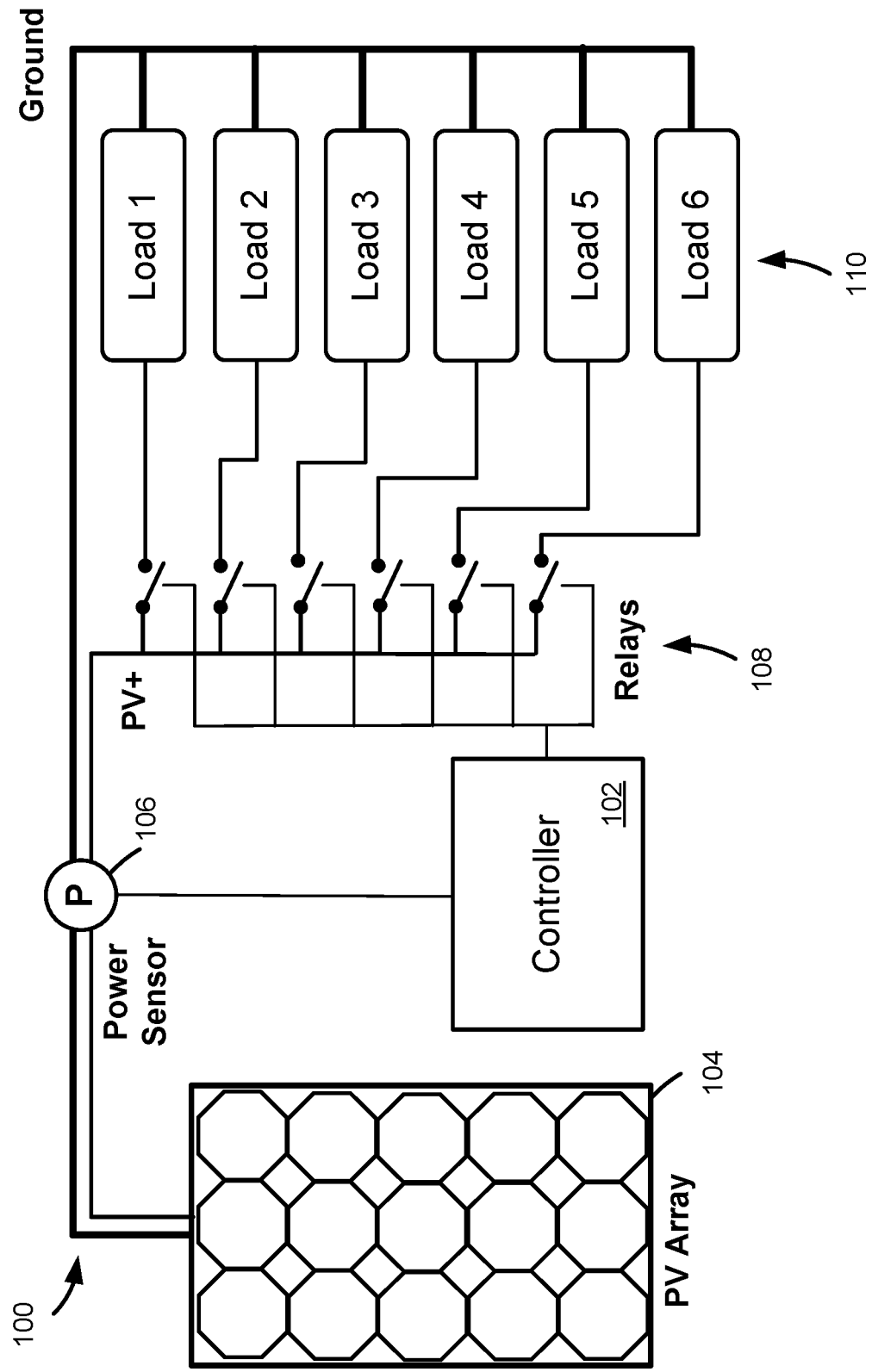
FIG. 1 illustrates a load-matching photovoltaic (PV) system with six loads, in accordance with various exemplary embodiments.

The detailed description of exemplary embodiments herein makes reference to the accompanying drawings, which show exemplary embodiments by way of illustration. While these exemplary embodiments are described in sufficient detail to enable those skilled in the art to practice the principles of the present disclosure, it should be understood that other embodiments may be realized and that logical changes and adaptations in design and construction may be made in accordance with principles of the present disclosure. Thus, the detailed description herein is presented for purposes of illustration only and not of limitation. For example, steps recited in any of the method or process descriptions may be executed in any suitable order and are not necessarily limited to the order presented. Furthermore, any reference to singular includes plural embodiments, and any reference to more than one component or step may include a singular embodiment or step.

For the sake of brevity, conventional techniques for photovoltaic (PV) panel construction and use, as well as conventional approaches for electricity generation, storage, use, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical load-matching controller for photovoltaics and/or method for utilizing intermittent electricity, for example, electricity generated by a photovoltaic system.

Principles of the present disclosure may be compatible with, complementary to, and/or improving upon or superseding concepts contained in U.S. Pat. No. 10,399,441 entitled "Digital Load Management for Variable Output Energy Systems" and/or in U.S. Pat. No. 11,658,483 entitled "Maximum Power Point Tracking through Load Management." The contents of each of the foregoing are hereby incorporated by reference (but excepting any subject matter disclaimers or disavowals, and except to the extent that the incorporated material is inconsistent with the express disclosure herein, in which case the language in this disclosure shall control).

Principles of the present disclosure include a method for maximum power point tracking (MPPT) in photovoltaic systems to maximize solar energy output. The method minimizes premature and faulty load switches and estimates a next optimal switch. Traditional solar photovoltaic systems manage power from a PV array to maximize power output to a load which is treated as a "black box" (i.e., its power demand being random and thus uncontrollable). The system disclosed herein matches the power demand of the loads with maximum available PV power by changing the number of loads connected to the PV array for maximum power point tracking. This system is scalable, lower-cost, and more efficient—for example, delivering nearly 100% of the maximum available PV energy to the loads while traditional systems with power converters may have a system energy yield of, e.g., about 85%.

U.S. Pat. No. 10,399,441 describes a photovoltaic system topology in which there are multiple loads. These loads are actively managed, while traditional solar photovoltaic systems manage the power from the photovoltaic array to maximize the power output. That is, the system described in U.S. Pat. No. 10,399,441 matches the power demand of the loads with the maximum available photovoltaic power by changing the number of loads connected to the photovoltaic array. Some advantages of the load-matching system include: (1) the load-matching system is more efficient than traditional systems with a power converter and delivers nearly 100% of the maximum available photovoltaic energy to the loads, while traditional systems with a power converter have a system energy yield around 85%; (2) the load-matching system has a lower cost as the power converter-based maximum power point tracker in traditional systems is eliminated (the load-matching system utilizes a microprocessor and a number of relays); and (3) the load-matching system has an excellent scalability from a few kilowatts peak to a gigawatt peak, wherein scaling is accomplished by adding more loads to the system, and there is no physical limitation on the controller of the system on how many loads the controller can manage.

The load-matching system disclosed in U.S. Pat. No. 10,399,441 utilizes a photodetector to monitor instantaneous maximum available photovoltaic power. The system makes decisions to connect or disconnect a next load based on the information from the photodetector. With respect to this system, some difference in operating conditions between the photodetector and the photovoltaic array may sometimes be observed. For example, when the temperature of the photodetector is different from that of the photovoltaic array, the loads may be connected or disconnected (i.e., switched) at sub-optimal moments. Small variations in position, orientation, and shading of the photodetector may affect the accuracy of the moments when loads are supposed to be connected or disconnected. These variations may result from wind, rain, snow, dust, falling leaves, bird droppings, etc. For example, a perfectly-optimized load-matching system may output 10% less energy the next day because of a small change in the photodetector. The systems and methods disclosed herein include an improved control strategy, e.g., eliminating a photodetector from a load-matching system.

The system disclosed in U.S. Pat. No. 11,658,483 includes an improvement of the system disclosed in U.S. Pat. No. 10,399,441. In the improved system, a photodetector is eliminated, and the system tracks the maximum power point by comparing the power delivered to the loads before and after a load is switched (i.e., connected or disconnected) from the photovoltaic array. The improved system also includes several control algorithms for maximum power point tracking and eliminates the photodetector and all issues related to it (e.g., making the load-matching system practical for commercial deployment).

The control algorithms described in U.S. Pat. No. 11,658,483 may make some unsuccessful connections and/or disconnections of the loads. As a brief aside, a connection or a disconnection of a load is termed as a "switch" herein—i.e., the control algorithms described in U.S. Pat. No. 11,658,483 may make some unsuccessful switches, which can reduce the photovoltaic energy delivered to the loads. Two types of possible unsuccessful switches include (a) a premature switch (i.e., the system makes a switch, finds that the power does not increase, and undoes the switch), which may occur based on the system not knowing the optimal switch moment(s) (and taking a trial-and-error approach until it finds an optimal switch moment), and (b) a faulty switch, which may be due to noise in a solar irradiance profile over time.

Faulty switches can be eliminated by several methods, including two methods disclosed in U.S. Pat. No. 11,658, 483: (1) waiting for a threshold power change after a successful switch and before attempting another switch; and (2) adding a time delay between two consecutive power measurements. Another method includes averaging multiple power measurements for one power data point. These methods can be used together or individually.

Principles of the present disclosure include a method to minimize the premature switches in the control algorithm for maximum power point tracking in the load-matching system. The method can estimate or predict a next optimal switch moment through premature switches. With this intelligent algorithm, the load-matching system can maximize its photovoltaic energy output.

Principles of the present disclosure present an improvement to the control algorithm for the load-matching photovoltaic systems described in U.S. Pat. No. 10,399,441 and in U.S. Pat. No. 11,658,483. These disclosures describe a solar photovoltaic system in which multiple loads are digitally managed in dynamic response to intermittent photovoltaic power. As a further improvement to the systems and methods described in these disclosures, the present disclosure describes a predictive control algorithm which minimizes unsuccessful switches and maximizes photovoltaic energy delivered to loads. For example, compared to the optimized trial-and-error algorithm in U.S. Pat. No. 11,658,483, the optimized predictive algorithm disclosed herein can reduce the number of unsuccessful switches by around 65%, while increasing the photovoltaic energy delivered to the loads. These improvements are on top of the about 25% lower levelized cost of electricity (LCOE) for the load-matching solar system when compared to conventional solar photovoltaic systems. Moreover, a load-matching system has excellent scalability, e.g., from a few kilowatts peak to a gigawatt peak. Scaling may be achieved by adding more loads, and there is no fundamental limitation on how many loads the system can manage.

The systems and methods described herein employ a predictive algorithm (rather than, e.g., a trial-and-error approach) to estimate optimal switch points using information from unsuccessful premature switches. By minimizing premature switches, the algorithm disclosed herein enables the system to maximize its photovoltaic energy output.

The applications of the principles of the present disclosure may include industrial electrolysis, solar energy storage, electric vehicle charging, among others. For example, with respect to industrial electrolysis, many raw materials important to modern life are produced electrolytically—including caustic soda, aluminum, copper, zinc, lithium, sodium, magnesium, calcium, potassium, lead, organic materials, etc. The annual production of caustic soda is 70 million tonnes globally at around the time of the present disclosure, with those of aluminum, copper, and zinc being, respectively, 64 million tonnes, 20 million tonnes, and 13 million tonnes. These electrolytic processes can be powered by solar energy utilizing the principles of the present disclosure.

In solar photovoltaic systems, maximum power point tracking may be achieved when the impedance of the system load matches that of the PV array. The conventional approach to MPPT is to manage the output power of the PV array to adjust its impedance. This requires power electronics (e.g., a power converter) which induce cost and power loss. In a different approach, a PV system can also vary the system load, by switching on and off parts of the load, to match the impedances and find the maximum power point. This offers an inexpensive and effective solution to MPPT as it does not require any conventional MPPT device. However, the load-matching PV system may be subject to power loss due to unsuccessful switches. The algorithm utilized in such a system may deploy a trial-and-error approach since the optimum switch point is typically unknown. The present disclosure presents a predictive algorithm that can dynamically estimate the optimum switch point(s) throughout the day using the powers measured from unsuccessful switches. This allows the load-matching PV system to track the maximum power point with minimum switches. The improved load-matching PV system may have applications in, e.g., PV-powered green hydrogen production.

Intermittency is a characteristic of solar photovoltaic power. Following uncertain weather, temperature, and seasonal conditions, the output power of a PV array (and thus its characteristic impedance) changes throughout the day. The mismatched impedances between the PV array and the system load may result in a power loss of up to, e.g., 25%. Maximum power point tracking becomes helpful in PV systems to extract the maximum possible PV power. Conventionally, the maximum power point tracking is implemented via the power electronics of the system such as an inverter or charge controller.

As of the time of the present disclosure, many MPPT algorithms developed over the preceding four decades can be classified into two categories: indirect MPPT and direct MPPT. In indirect algorithms, previous information is required in order to periodically estimate the maximum power point (MPP) throughout the day. These algorithms take measurements at different seasons and make assumptions depending on the irradiance level. Direct MPPT algorithms measure the instantaneous PV voltage and current to make a more accurate response in comparison to the indirect algorithms. Direct MPPT techniques such as perturb and observe (P&O), incremental conductance, and fractional open circuit voltage are utilized in the PV systems at the time of the present disclosure. These techniques do not require previous information about the system. Also, there are additional algorithms which include fuzzy logic, particle swarm optimism, artificial neural networks, artificial bee colony, and genetic algorithms. All these techniques approach MPPT by managing the PV power. The PV impedance is adjusted to match the load impedance for the system to operate at the maximum power point throughout the day. Power management requires power electronics such as DC/DC converter or DC/AC inverter. Each power device is linked with a monetary cost and a power loss which reduce the levelized cost of electricity (LCOE). It also defines the power rating of the system which limits the size and scalability of the PV system.

In the present disclosure, an improved PV system topology is presented through load management. Instead of altering the PV characteristic impedance, a system may change the load impedance to match the instantaneous PV impedance. It can perform MPPT while eliminating a central converter used in conventional approaches. This cuts down the upfront system cost and provides an improved system energy efficiency. Also, a system may use a direct MPPT approach with a power sensor to make decisions. The sensor can monitor the PV power delivered to the loads. When such a system switches a load on or off, it can compare the powers delivered to the loads before and after the switch (i.e., connection or disconnection of a load) to track the higher power. Such an algorithm may continue until the maximum power point is found. The point at which the powers before and after a switch are equal may be referred to herein as an optimum switch point.

With such MPPT algorithm for the load-matching PV system, premature switches may happen when the system switches (i.e., connects or disconnects) a load in response to irradiance changes, but the power does not increase. The system can lose power during premature switches since it operates further away from the maximum power point. Premature switches may be due to the optimum switch point typically being unknown, and a system may employ a trial-and-error tactic to find it. The present disclosure introduces an improvement in the MPPT algorithm—a predictive algorithm for MPPT in the load-matching PV system. It is a direct MPPT technique allowing it to be adaptable to various irradiance conditions. It estimates the next optimum switch point based on two consecutive premature switches, and it can make a more accurate decision on switching a load. It can reduce the number of premature switches and improve the energy efficiency of the load-matching system.

Concept of Load-Matching PV Systems

Load-matching systems may be useful when using loads that are well-defined in the system such as resistive loads, electrolyzers, and electric vehicles. While the present disclosure includes description with respect to resistive loads to highlight the conceptual benefits of the disclosed predictive algorithm, the disclosed algorithm can support other types of loads as would be apparent to one of ordinary skill in the art reviewing the present disclosure.

FIG. 1 is a schematic of a load-matching PV system 100 with six loads. The system 100 includes a PV array 104, a power sensor 106, a controller 102, six relays 108, and six loads 110. As discussed herein, while six relays and six loads are illustrated in FIG. 1, it would be apparent to one of ordinary skill in the art that the number of relays and loads can be different without departing from the spirit of the present disclosure. As shown, the power sensor 106 may continuously monitor the power delivered to the loads 110 throughout the day. The algorithm disclosed herein (as, e.g., implemented and executed via the controller 102) can determine the number of loads 110 that should be connected to the PV array 104 in order to extract the maximum possible PV power based on the information provided by the power sensor 106. Since the maximum available PV power is dependent on irradiance conditions, the system 100 can respond to any irradiance change and adjust the number of connected loads 110 accordingly. The controller 102, which may be connected to the power sensor 106 and the relays 108, may receive sensor data from the power sensor 106 and determine when and which relay(s) may be controlled to connect or disconnect the load(s) 110 in order to achieve the maximum possible PV power based on the disclosed algorithm. As an aside, the controller 102 may, as but one example, be a microprocessor configured to perform the predictive algorithm described herein to, e.g., predict an optimum switch point for a load 110 and control a relay 108 connected to such load 110 to switch (i.e., connect or disconnect) the load 110 at the predicted optimum switch point (i.e., a power level and a timing at which a next switch is to occur).

Figure 2:
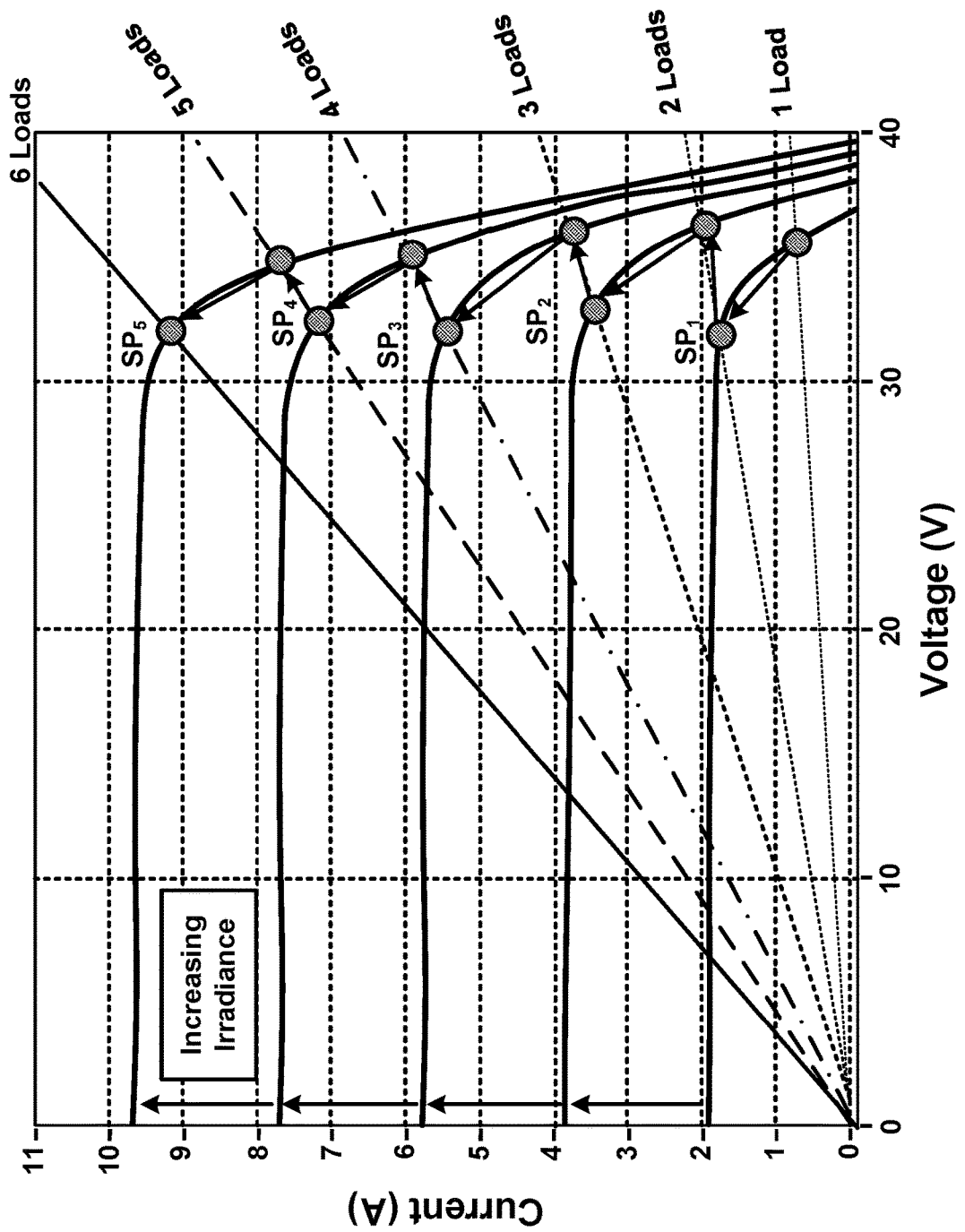
FIG. 2 illustrates load-line analysis for a load-matching PV system with six equal-resistance loads, in accordance with various exemplary embodiments.

The load-line analysis illustrated in FIG. 2 shows how a system may perform MPPT. The six straight load lines in FIG. 2 represent the reciprocal combined resistance of a set number of loads connected in parallel. The system can only operate along these straight lines. Different numbers of connected loads offer an interval of different operating points for the system. The load lines are laid on top of the current-voltage curves of a 60-cell PV module under different irradiance levels (200, 400, 600, 800, and 1,000 W/m²). When the irradiance increases, the system may connect more loads to the PV array to operate closer to the maximum power point. $SP_1$ through $SP_5$ represent the optimum switch points for Load 2 through Load 6, while Load 1 is always connected to the PV array in this example (but can be connected later based on the information from the power sensor 106 in FIG. 1).

To maximize the system energy efficiency, the combined resistance of all the loads connected in parallel must match the characteristic resistance of the PV array, e.g., at noon when the power output from the PV array is maximum throughout the day. This allows the system to match the power output of the PV array at maximum irradiance with the combined power demand of all the loads. This can be achieved when:

$$\frac{R_L}{n} = \frac{V_{mpp}}{I_{mpp}} \tag{1}$$

where $V_{mpp}$ and $I_{mpp}$ are the voltage and current of the PV array at the maximum power point under the maximum irradiance, RL is the resistance of each of the equal-resistance loads, and n is the number of loads in the system. Additionally, if more loads are available in the system, they can provide the system with more operating points to match the maximum power point throughout the day and thus a higher system energy efficiency.

The power efficiency of MPPT algorithms may differ depending on the current power output. For example, the power efficiency with DC/AC inverters used for MPPT in conventional PV systems can range from 80% to as high as 99% depending on the ratio of input power to the rating of the converter. To properly calculate the performance of MPPT algorithms, the daily energy utilization efficiency can be used to analyze the effectiveness of MPPT algorithm throughout the day. The system energy efficiency can be defined as:

$$\eta = \frac{\left(\int (\text{Power Delivered})dt\right)}{\left(\int (\text{Power Available})dt\right)} \times 100\% \tag{2}$$

This equation represents the ratio between the total energy delivered to the loads and the total available energy.

Figure 3:
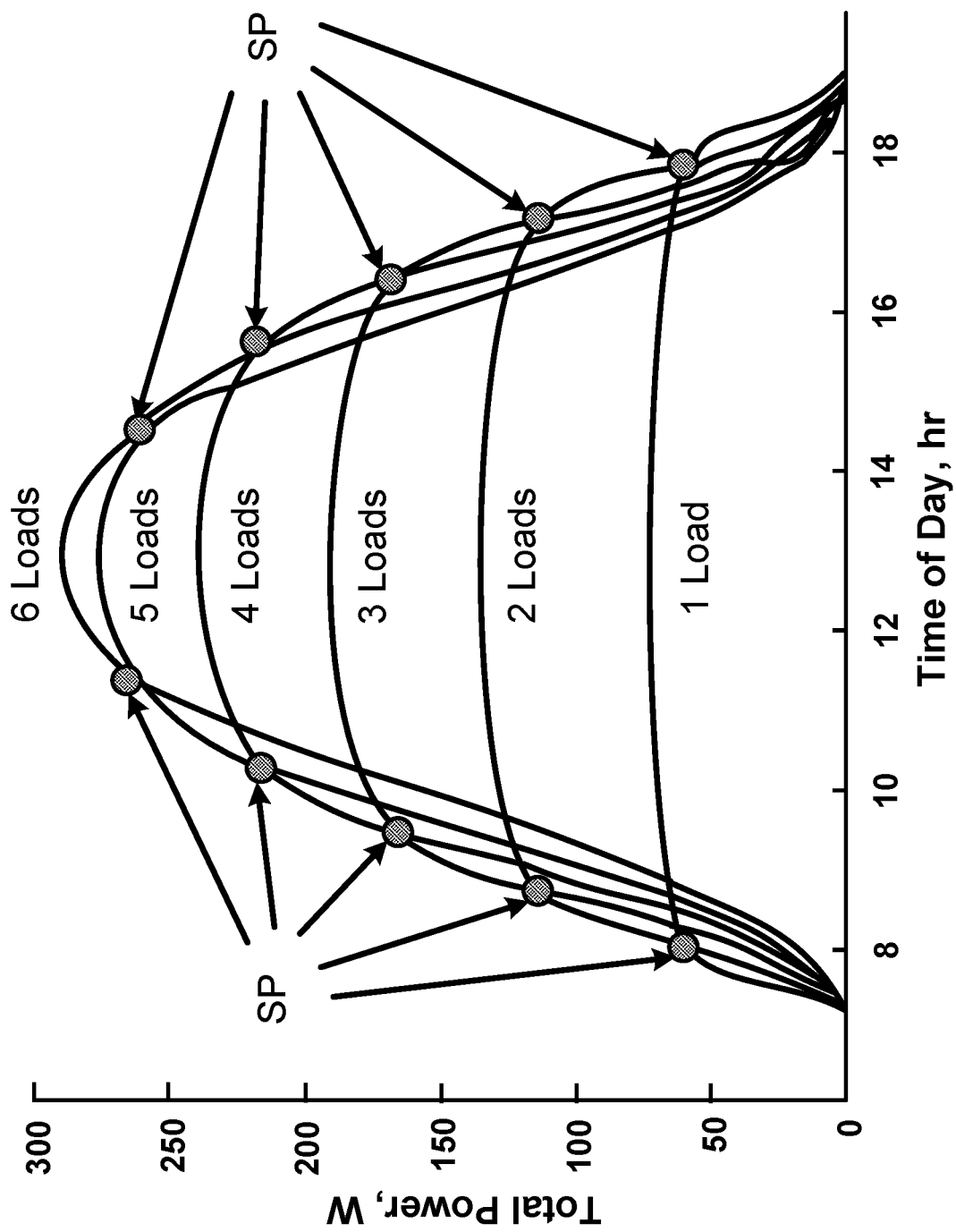
FIG. 3 illustrates all possible operating points for a load-matching PV system with six equal-resistance loads, in accordance with various exemplary embodiments.

FIG. 3 shows all possible operating points for a system with six equal-resistance loads (similar to the system 100 illustrated in FIG. 1). The resistance may be selected to satisfy the equation (1). Each of the six curves represents all the operating points for a given number of connected loads. To extract the maximum possible PV power, the system must track the outermost operating points in FIG. 3. The challenge for the control algorithm is to find the optimum switch points, labeled with "SP" in FIG. 3, where two power curves intersect. These are critical points to maximize the system's energy efficiency. It is also noted that with more loads, there will be more optimum switch points to match the maximum available PV power, thus a higher system energy efficiency. For the system in the present disclosure having six equal loads, the maximum daily system energy efficiency may be approximately 98%. Daily energy efficiency of over 99% can be achieved with more than eight loads, for example.

FIGS. 2 and 3 illustrate the load-matching PV system during a sunny day. However, partial shading is also an important factor to be considered for PV systems. Partial shading occurs when the irradiance on a substring of solar cells is unequal, leading to a difference in current flow. If there are no bypass diodes, it can result in reverse current flow, reverse bias, and power dissipation on shaded cells. Additionally, the PV array's current can only be as high as the magnitude of the most shaded cell in series connections. Bypass diodes are typically associated in many solar systems to avoid the reverse flow and result in an IV curve with multiple extremum points. These local maximum power points can trap many MPPT algorithms away from the global maximum and lead to significant power loss. Several methods have been proposed in traditional algorithms on how to find the global maximum power point under partial shading. After identifying that there is shading occurring, the convention is to sweep along different operating points in order to find the global maximum for conventional MPPT algorithms. The strategy to track the global maximum is used to enhance existing adaptive algorithm such as P&O at the time of the present disclosure.

Figure 4:
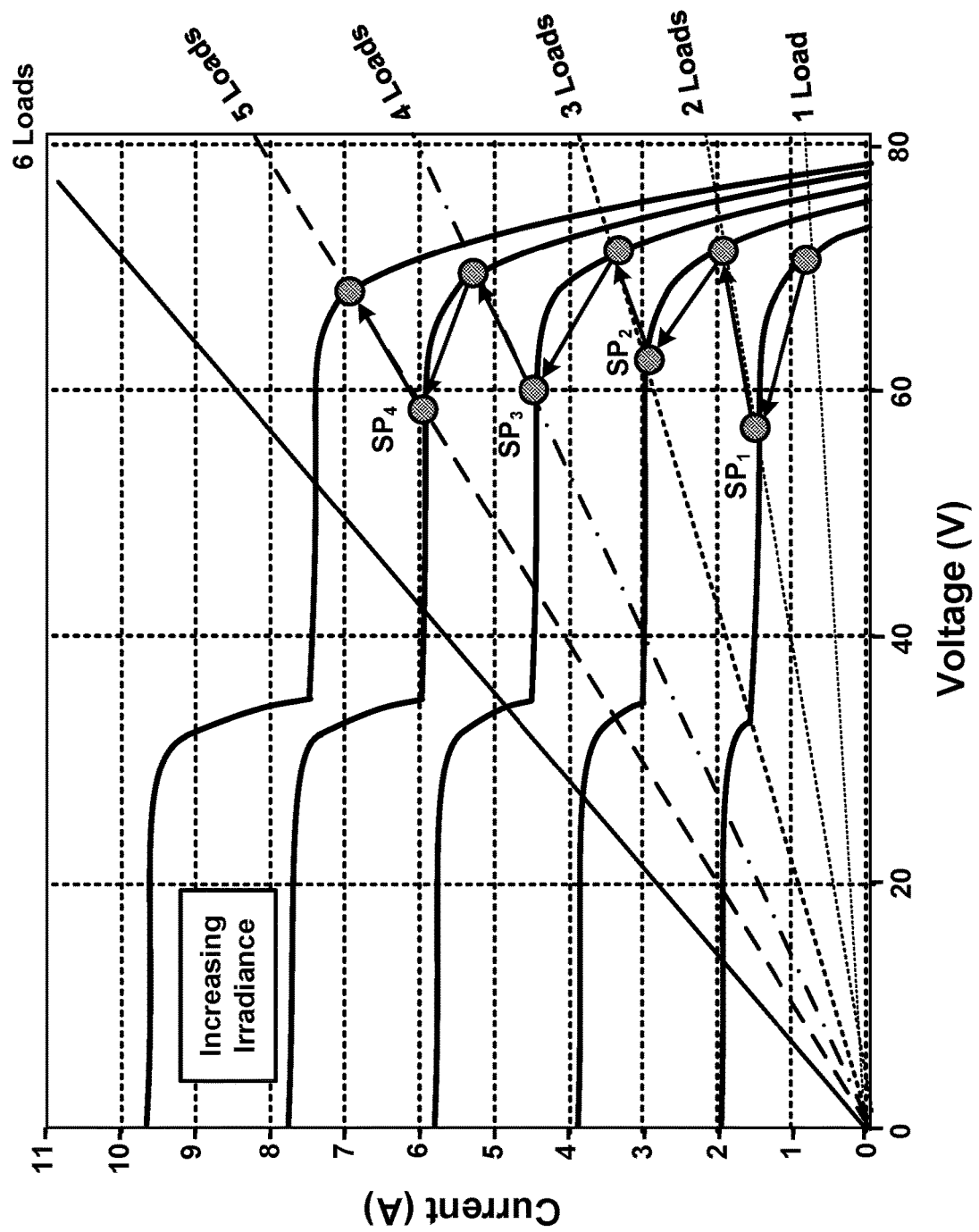
FIG. 4 illustrates load-line analysis for a partially-shaded load-matching PV system with six equal-resistance loads, in accordance with various exemplary embodiments.

FIG. 4 shows the load-line analysis for the same load-matching system as in FIG. 2, but with bypass diodes, under partial shading conditions. As with conventional MPPT, the load-matching PV system is capable of using conventional techniques to find the global maximum power point. Instead of varying the voltage, it can perform load sweeps, i.e., changing the number of loads connected to the PV array from 0 to 6, to avoid being stuck in local maximum situations. This has been demonstrated in the load-matching PV system as it was successful in following the maximum power point on cloudy days. For the present disclosure, a basic loading sweep was utilized to find the global maximum to first demonstrate the effectiveness of the algorithm in general settings, but more complex and more efficient partial shading strategies may be adopted with the system described herein.

Trial-and-Error Algorithms for Load-Matching PV Systems

Figure 5:
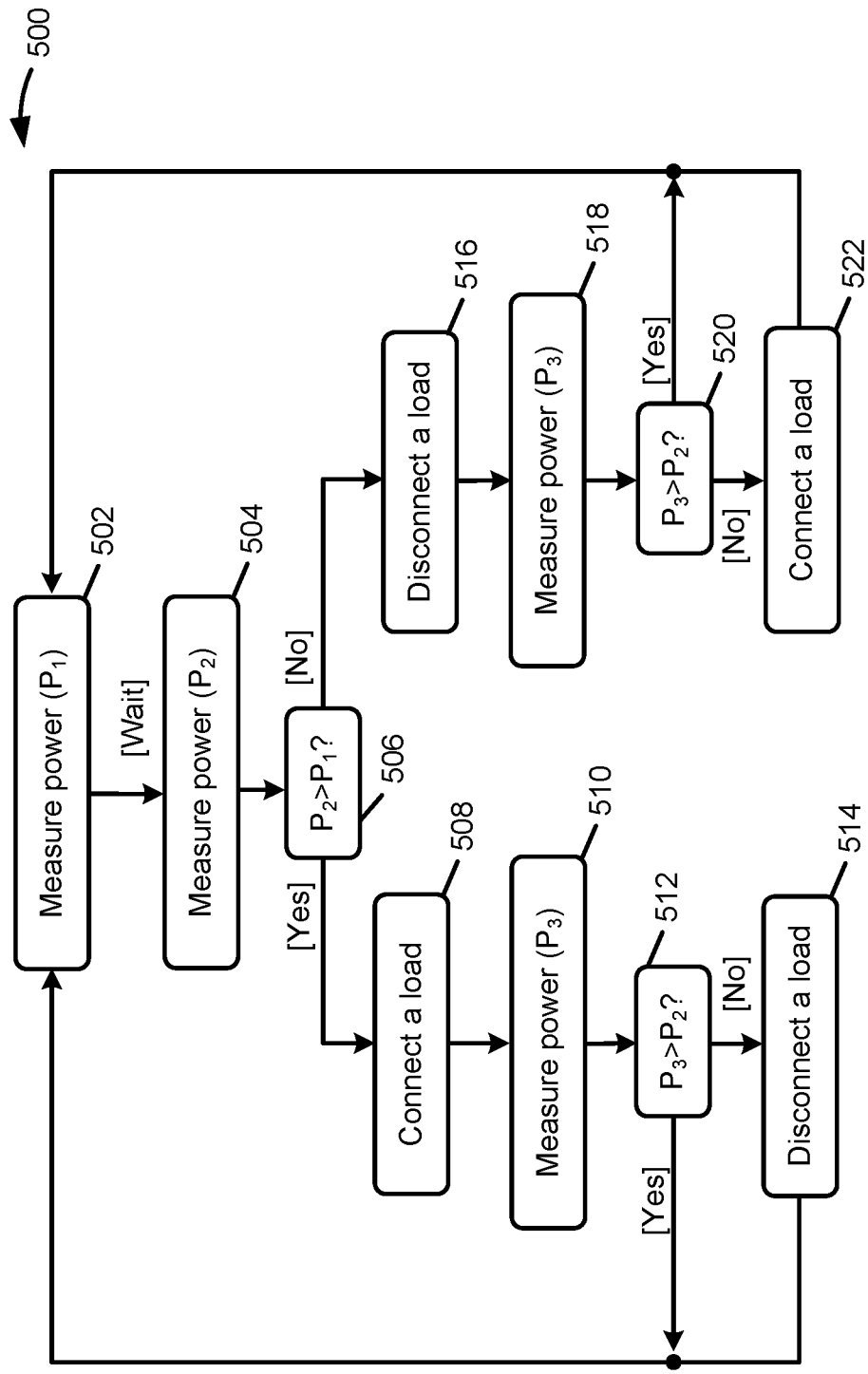
FIG. 5 illustrates a trial-and-error algorithm for maximum power point tracking (MPPT) in a load-matching PV system, in accordance with various exemplary embodiments.

As shown in FIG. 5, a trial-and-error MPPT algorithm 500 for load-matching PV systems may start off with making two power measurements ($P_1$ and $P_2$) with a time interval (see steps 502 and 504). The measurements can reveal whether the irradiance is increasing or decreasing (see step 506). If the irradiance is increasing, the system will only try connecting a load (see step 508). Otherwise, the system will try disconnecting a load (see step 516). Once the algorithm (e.g., implemented via a microprocessor) makes a decision, the system can switch (i.e., connect or disconnect) a load by closing or opening a relay. A third power measurement may then be performed, $P_3$ (see steps 510 and 518). $P_3$ can be compared with the power measured before the switch, $P_2$, to determine if the system has found an optimum switch point (see steps 512 and 520). If $P_3$ is higher than $P_2$, the system keeps the switched load and proceeds with the higher power. Otherwise, the system undoes the switch and goes back to the original set of connected loads (see steps 514 and 522). The power measurements are then erased, and the system starts over again until the maximum PV power is delivered.

Figure 6:
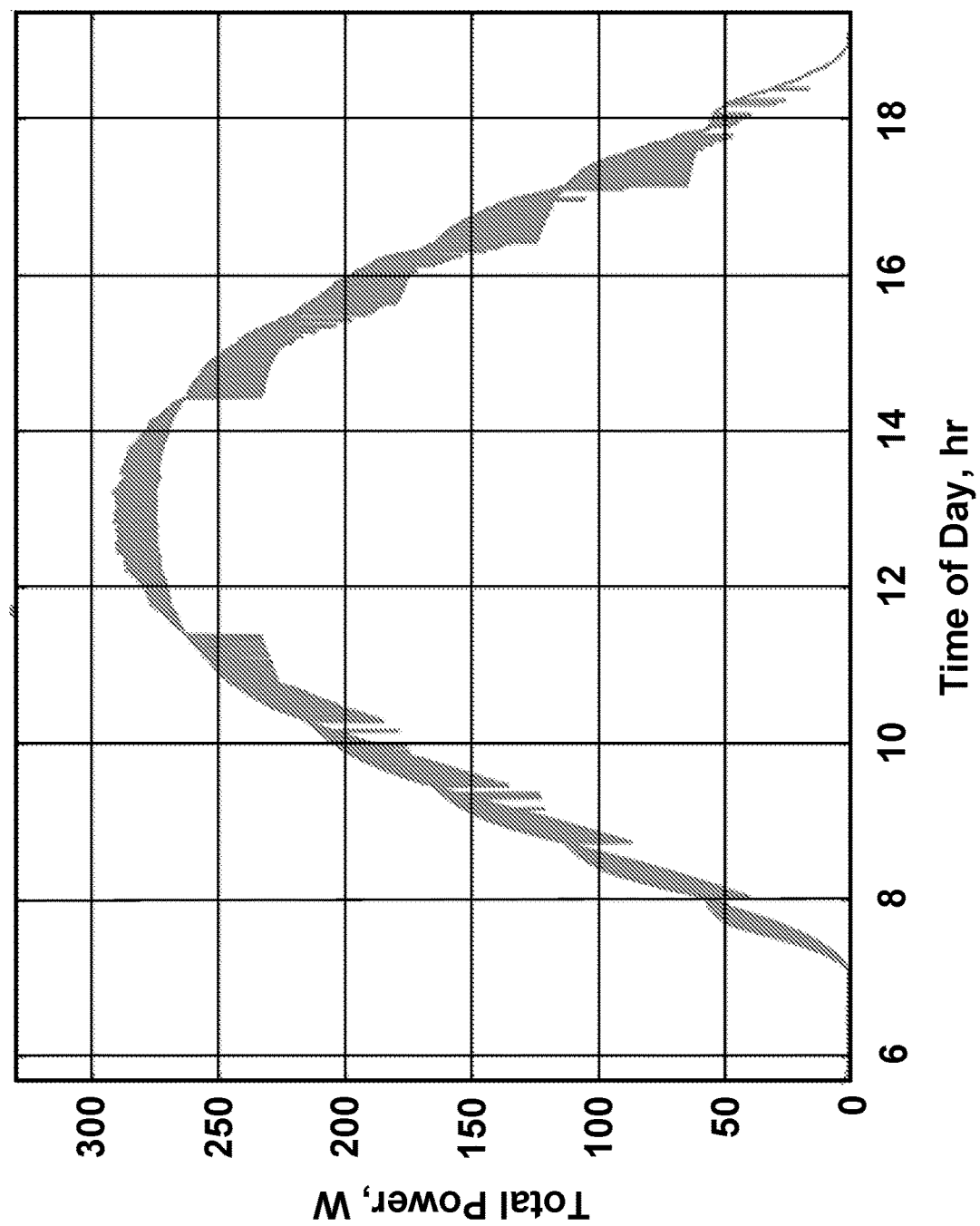
FIG. 6 illustrates power delivered to a load-matching PV system with six equal loads using the algorithm illustrated in FIG. 5 on a sunny day, in accordance with various exemplary embodiments.
Figure 7:
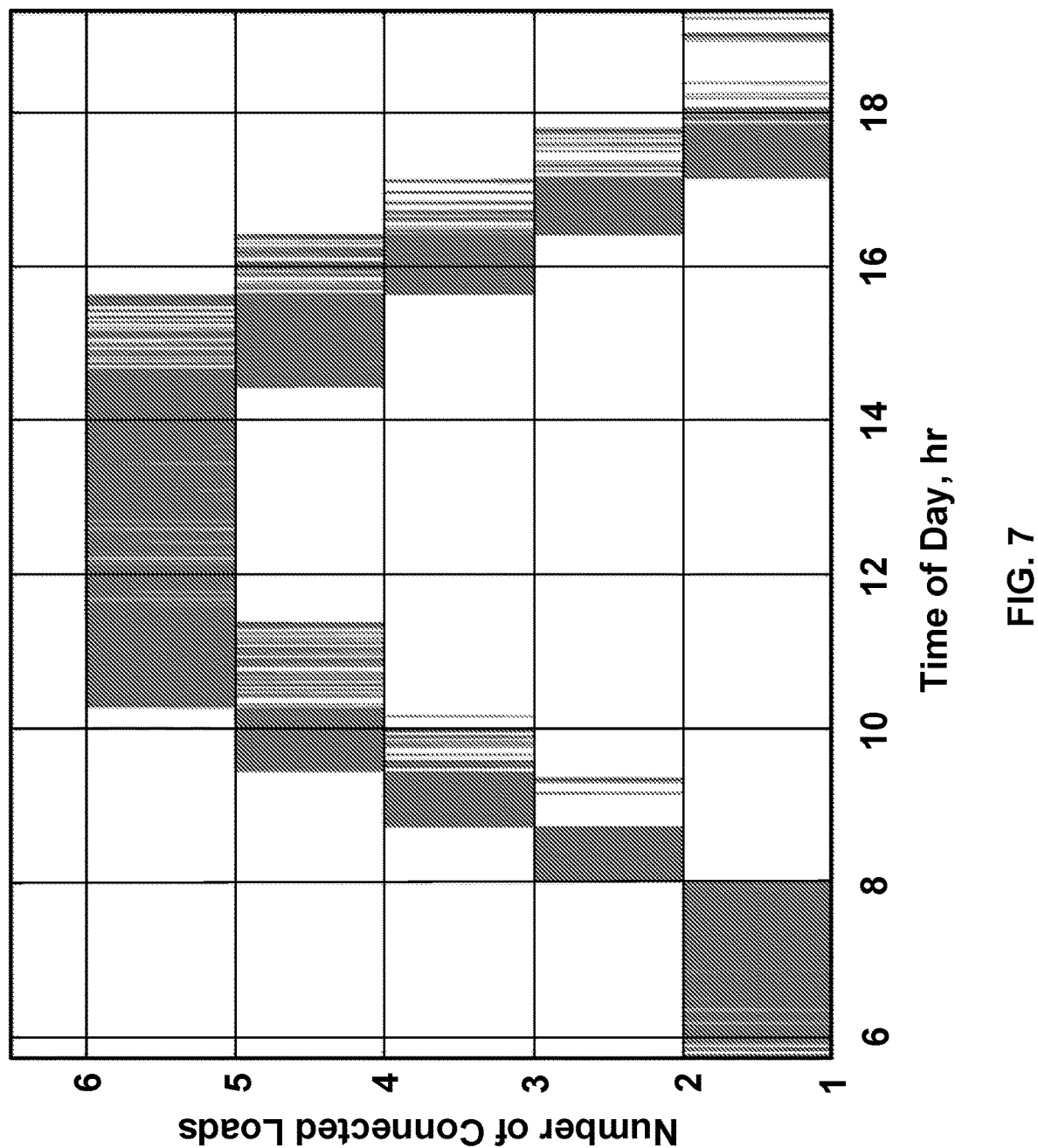
FIG. 7 illustrates the number of connected loads in a load-matching PV system with six equal loads using the algorithm illustrated in FIG. 5 on a sunny day, in accordance with various exemplary embodiments.

The results of this algorithm for a sunny day, as shown in FIGS. 6 and 7, demonstrate that it can successfully track the maximum power point without the need for a conventional MPPT device. The power delivered to the loads would properly follow the maximum power points shown in FIG. 3 throughout the day. However, unsuccessful switches may occur as depicted in the bolded regions in FIG. 7. For a system with six loads, there are only ten optimum switch points on a perfectly sunny day as shown in FIG. 3, but the algorithm illustrated in FIG. 5 resulted in, in one example simulation scenario, about 3,800 switches for both sunny and cloudy days, most of which were unsuccessful.

Figure 8:
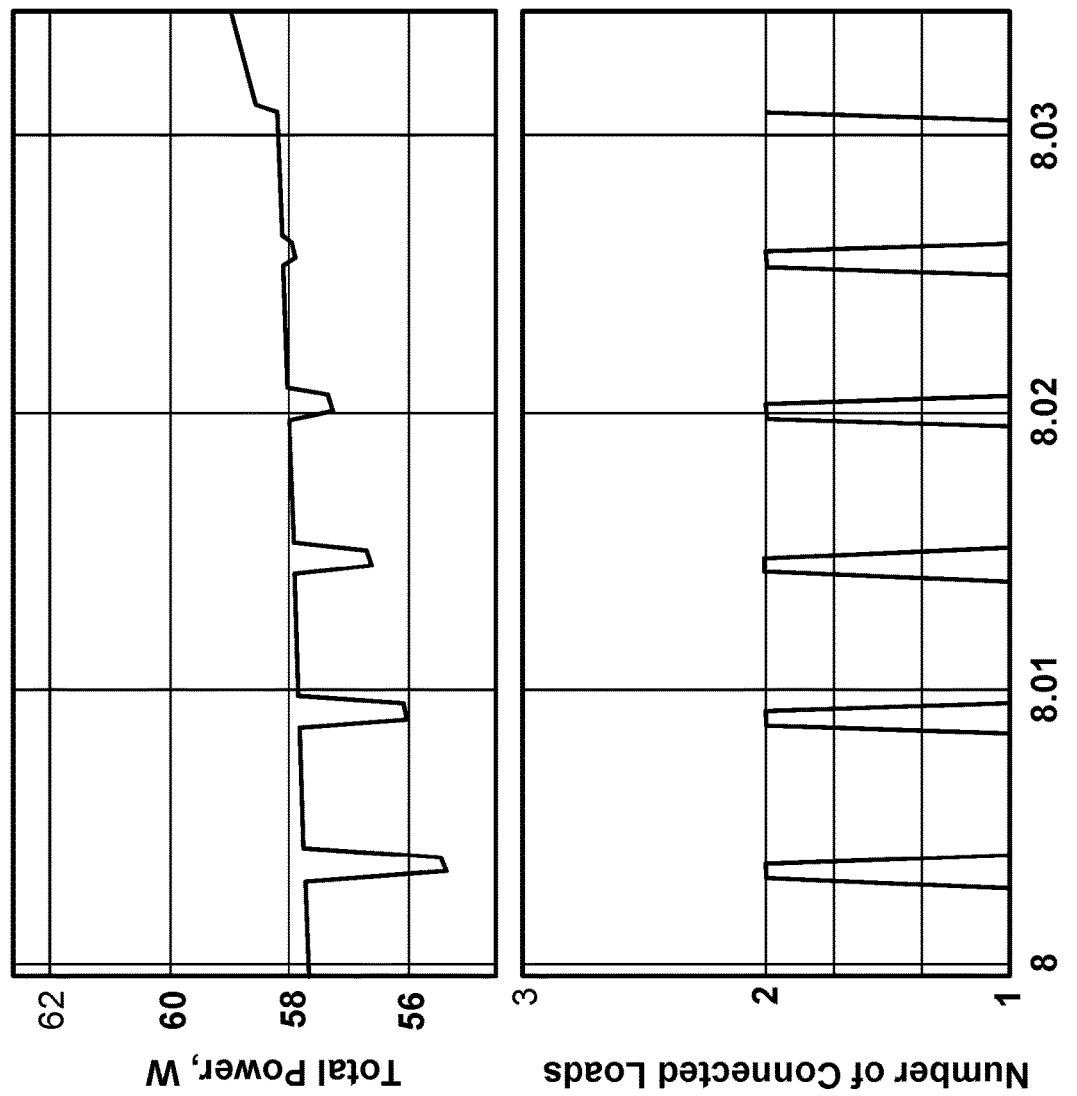
FIG. 8 illustrates an example of premature switches in a load-matching PV system with the trial-and-error algorithm illustrated in FIG. 5, in accordance with various exemplary embodiments.
Figure 9:
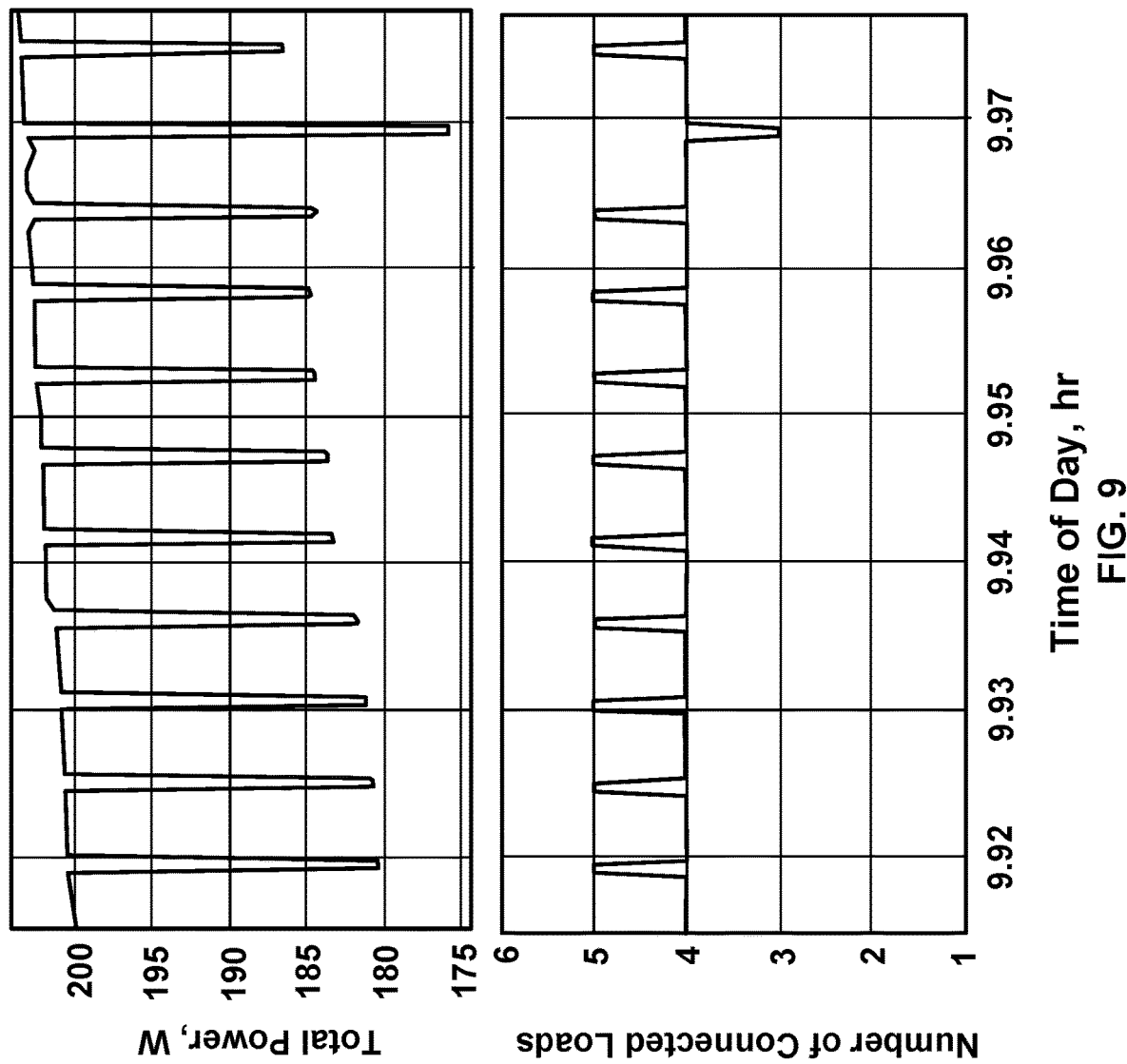
FIG. 9 illustrates an example of a faulty switch in a load-matching PV system with the trial-and-error algorithm illustrated in FIG. 5, in accordance with various exemplary embodiments.

There are two types of unsuccessful switches: premature and faulty switches. FIG. 8 shows an example simulation of premature switches in the load-matching system. Around 8 AM on a sunny day, the irradiance was increasing, so the system attempted to connect Load 2 to the PV array in parallel with Load 1. However, before the optimum switch point was reached at around 8:03 AM, each switch was premature and caused a dip in power. As a result, the system switched off Load 2 and went back to one connected load each time. Faulty switches happen when the system connects a load when the irradiance is decreasing or disconnects a load with the irradiance increasing. FIG. 9 shows an example simulation of a faulty switch in the load-matching system. The irradiance was increasing, resulting in the system trying, unsuccessfully, to connect a load. Suddenly, the system disconnected a load at around 9:58 AM. Faulty switches are due to noises in the irradiance profile. They are less common, but the power loss during faulty switches can be more significant than premature switches.

Several parameters in the algorithm illustrated in FIG. 5 may be optimized to minimize unsuccessful switches. Such optimization includes a time delay between two power measurements $P_1$ and $P_2$, an averaged reading of multiple power measurements, and a threshold power change between a successful switch and the next switch attempt. These parameters were examined on both a sunny day and a cloudy day. It was found that a delay time between 10 seconds and 30 seconds is helpful for cloudy and sunny days, respectively. The optimum number of power measurements to average was 350. The optimum power threshold before attempting the next switch was 2% for a system with six loads.

Figure 10:
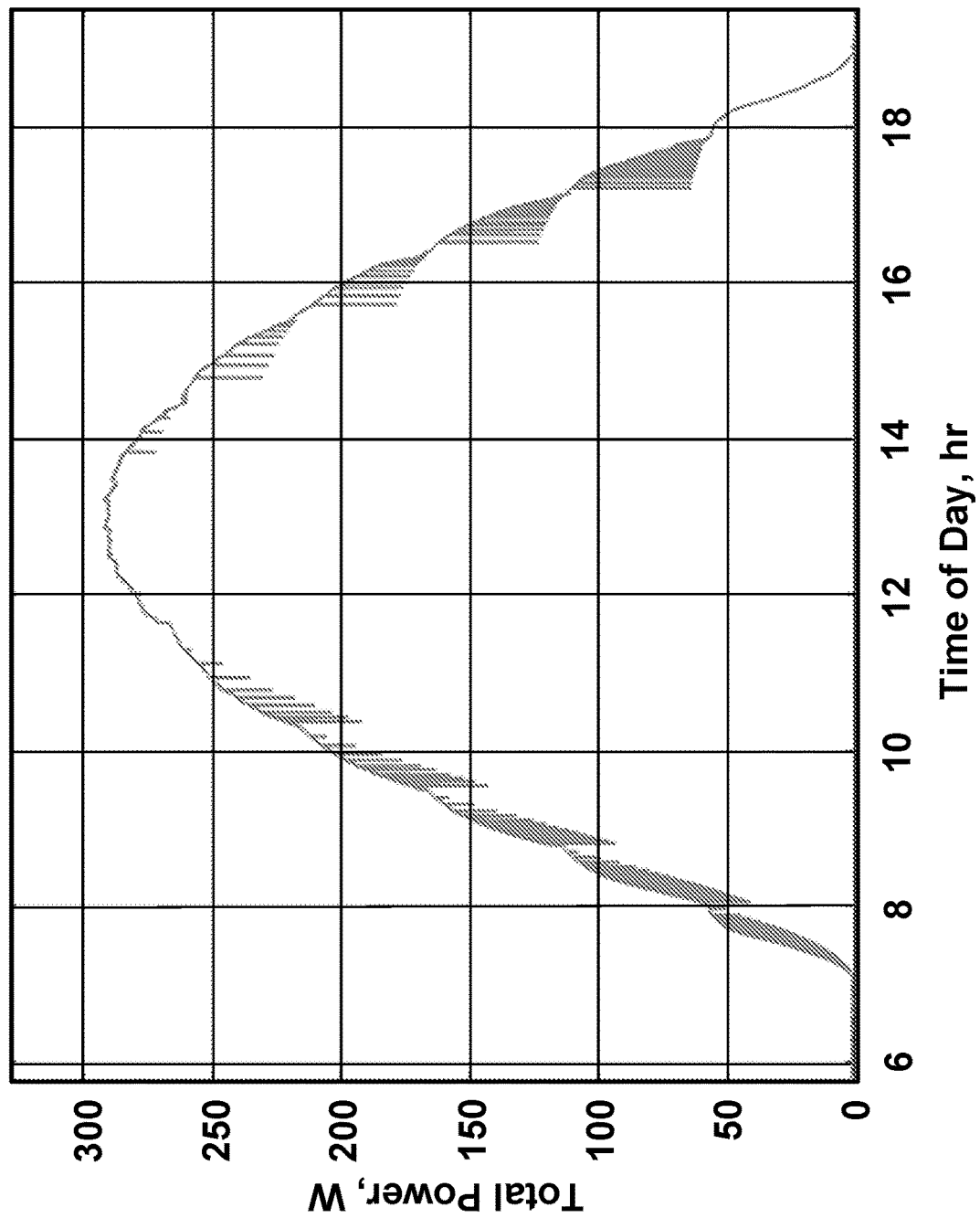
FIG. 10 illustrates power delivered to a load-matching PV system with six equal loads using an optimized trial-and-error algorithm on a sunny day, in accordance with various exemplary embodiments.
Figure 11:
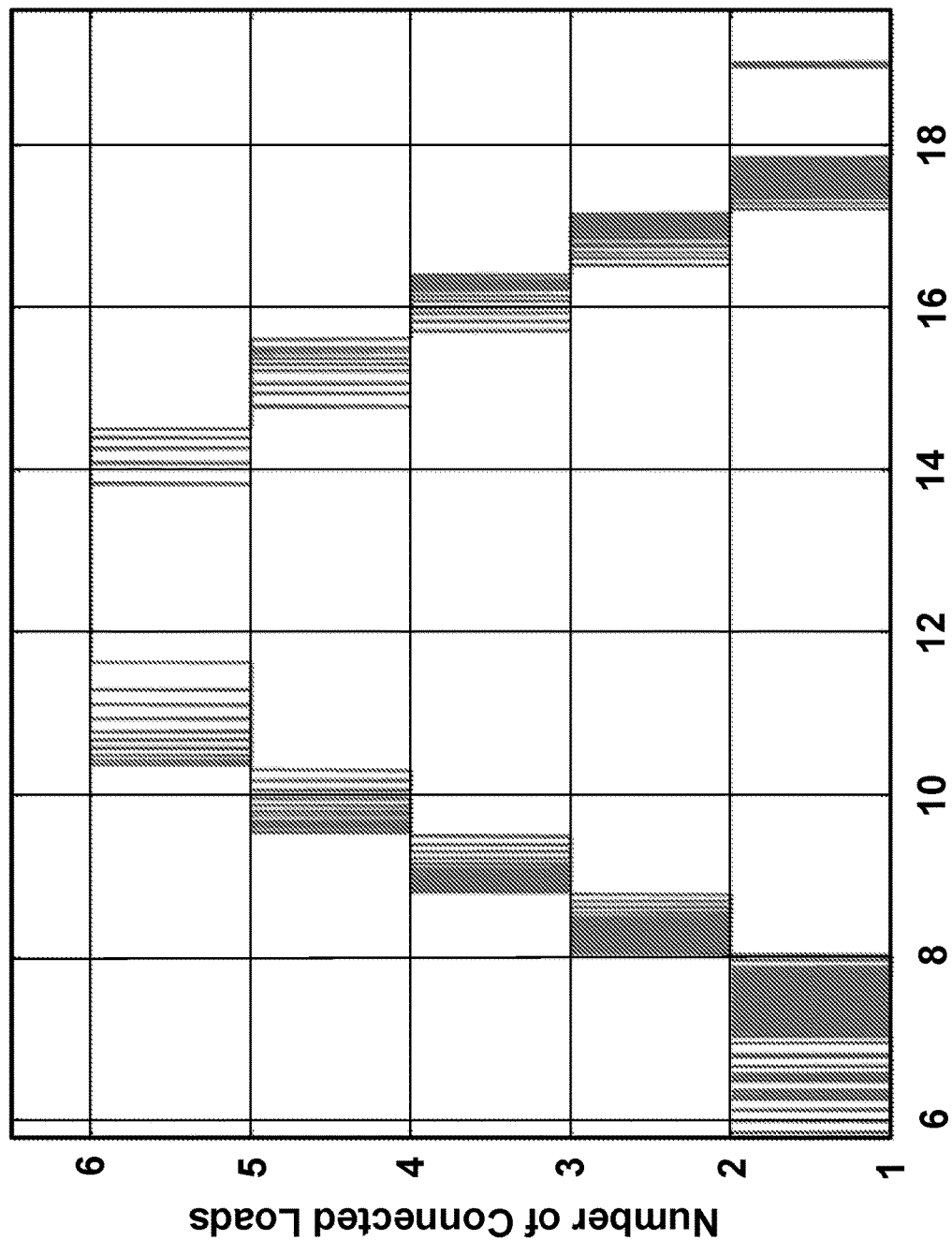
FIG. 11 illustrates the number of connected loads in a load-matching PV system with six equal loads using an optimized trial-and-error algorithm on a sunny day, in accordance with various exemplary embodiments.
Figure 12:
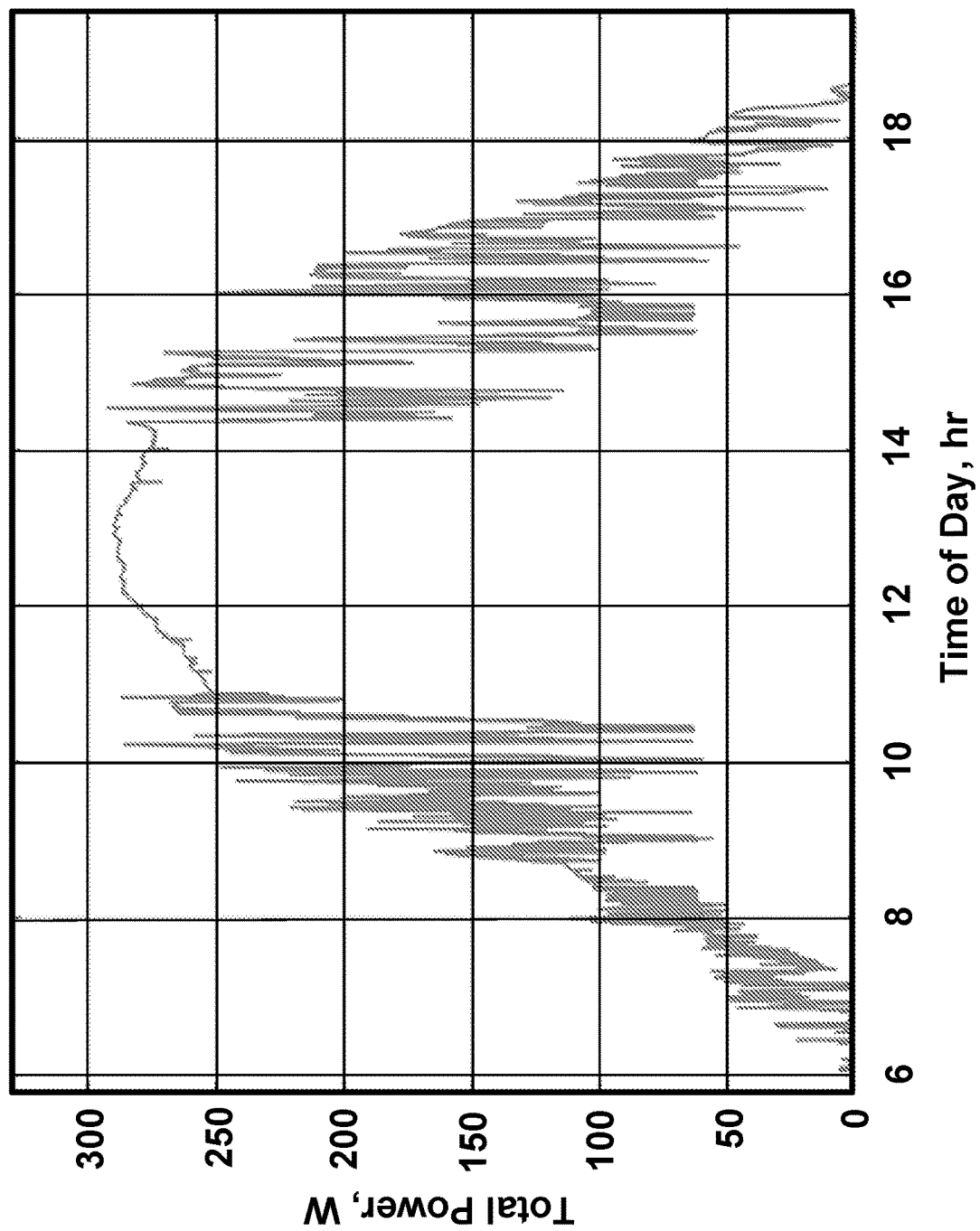
FIG. 12 illustrates power delivered to a load-matching PV system with six equal loads using an optimized trial-and-error algorithm on a cloudy day, in accordance with various exemplary embodiments.
Figure 13:
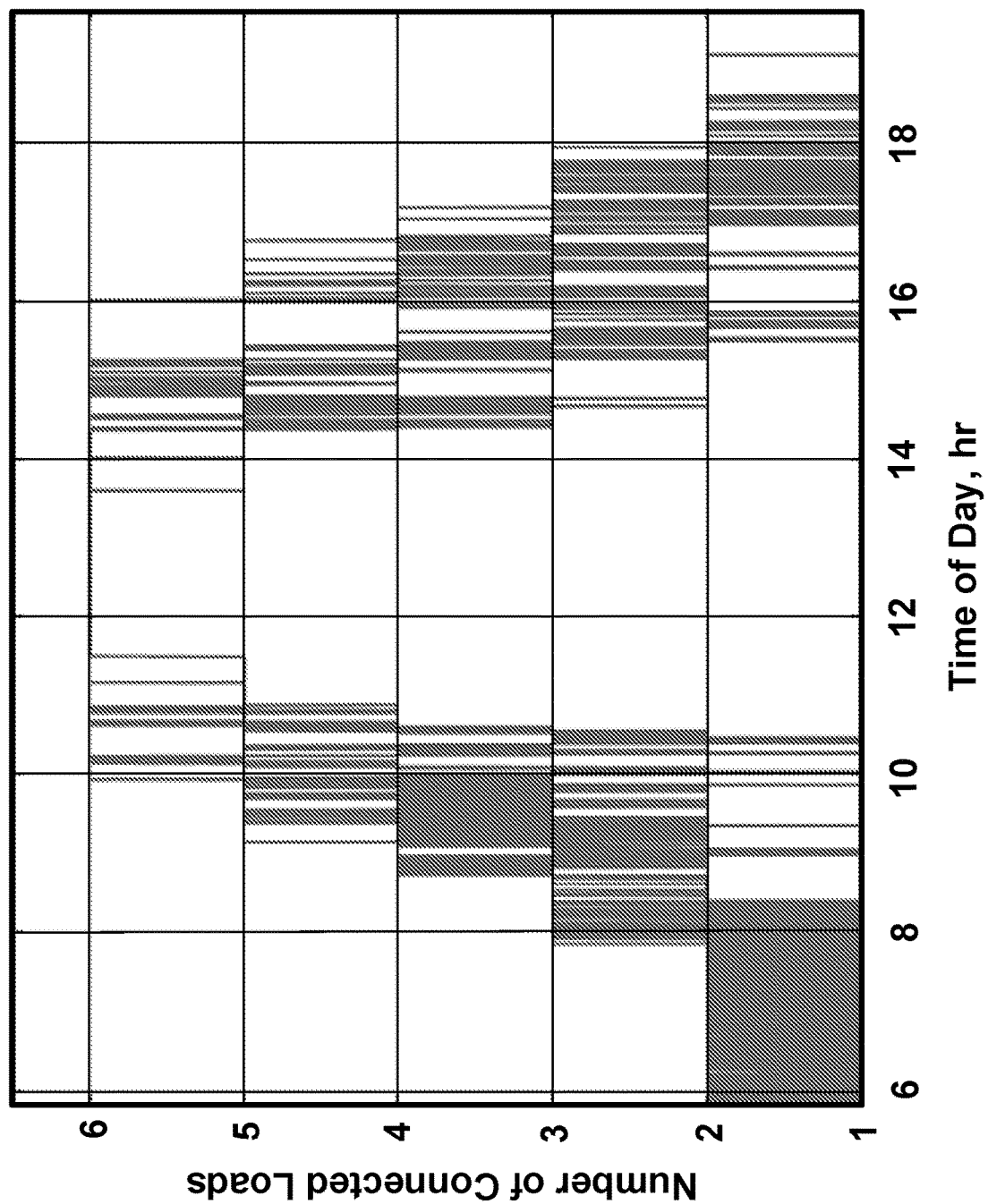
FIG. 13 illustrates the number of connected loads in a load-matching PV system with six equal loads using an optimized trial-and-error algorithm on a cloudy day, in accordance with various exemplary embodiments.

The results of a simulation with the optimized trial-and-error algorithm are shown in FIGS. 10 and 11 for a sunny day and FIGS. 12 and 13 for a cloudy day. The optimized trial-and-error algorithm was able to significantly reduce unsuccessful switches, cutting down over 3,000 and 1,400 unsuccessful switches on sunny and cloudy days, respectively. Faulty switches were completely eliminated. Consequently, the system energy efficiency improved by 1.1% and 1.5% on sunny and cloudy days, respectively. Table 1 shown below compares the performance of the optimized trial-and-error algorithm with the unoptimized trial-and-error algorithm on a sunny day.

TABLE 1

PERFORMANCE OF THE UNOPTIMIZED AND OPTIMIZED TRIAL-AND-ERROR ALGORITHMS ON A SUNNY DAY

|  | Unoptimized Algorithm | Optimized Algorithm |
| --- | --- | --- |
| Delay Time (s) | 10 | 30 |
| Power Threshold (%) | 0 | 2 |
| Number of Averaged Measurements | 1 | 350 |
| Total Number of Switches | 3840 | 764 |
| Total Energy Delivered (Wh) | 2117.3 | 2140.6 |

Although faulty switches were eliminated by the optimized trial-and-error algorithm, there was still a notable number of premature switches. In fact, over 95% of the switches were still unsuccessful. These premature switches can continue causing power loss and shortening the lifetime of the relays. Further increase in delay time and/or power threshold would reduce faulty switches but come with a loss in system energy efficiency due to the system switching too late and missing the optimum switch point. Besides that, a long delay time and/or a large power threshold may also get the system stuck in a local maximum. As shown in FIG. 3, if the system waits too long, the operating point will stray far away from the exterior maximum power curve and move to the middle of a power curve where the power barely increases for a fixed number of loads. When this happens, the system may disregard the small power changes as irradiance noise and proceed with the current number of connected loads, missing the global maximum. Therefore, another improved approach is needed to further reduce premature switches.

Predictive Algorithm for Load-Matching PV Systems

Figure 14:
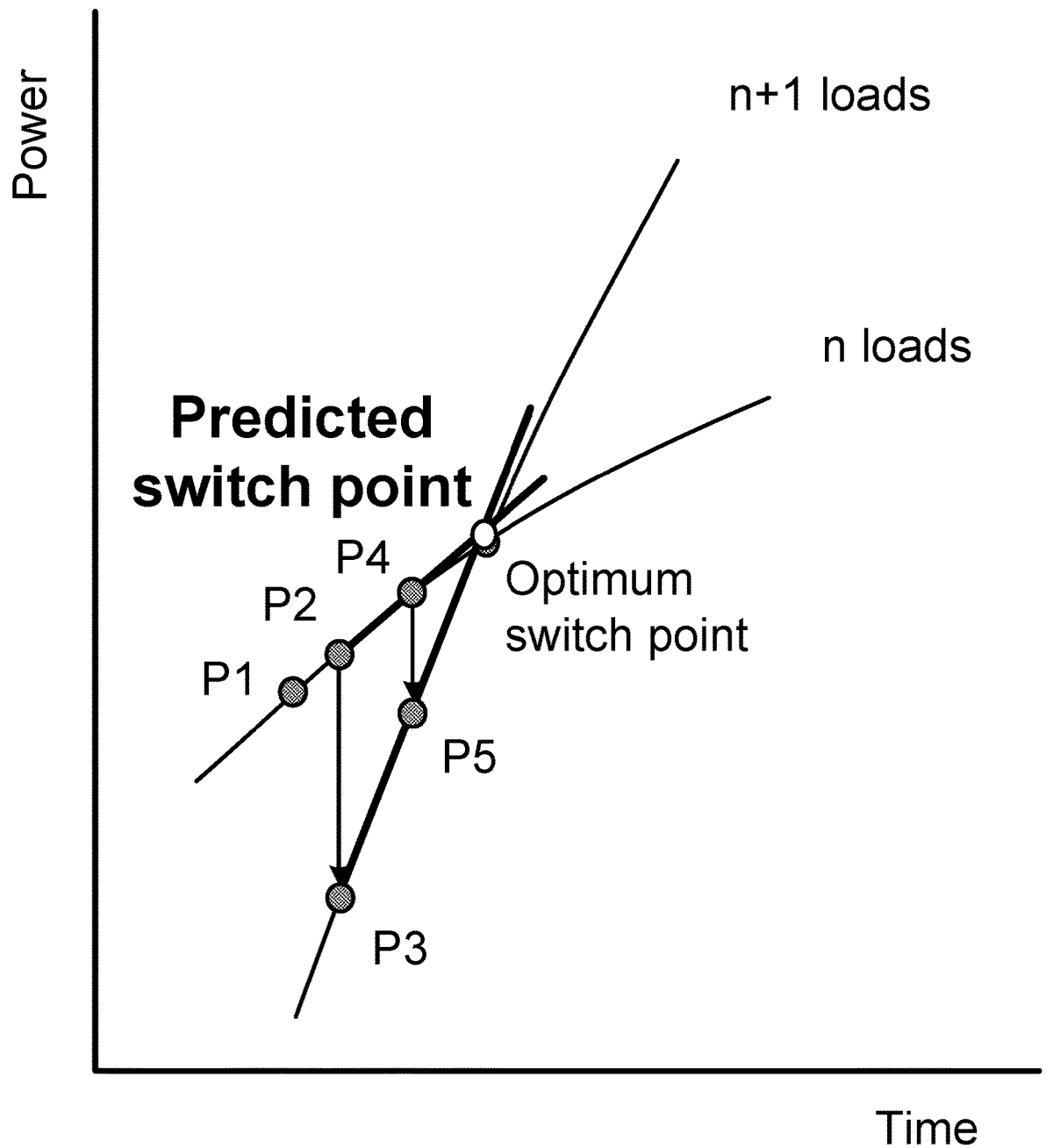
FIG. 14 illustrates estimation of an optimum switch point through two consecutive premature switches, in accordance with various exemplary embodiments.

Like all direct MPPT algorithms, power oscillation may be induced in order to provide controllers with information to find the MPP. It may be noted that in the load-matching PV system, premature switches cannot be completely eliminated, only minimized. The predictive algorithm described herein uses two consecutive premature switches to predict the next optimum switch point, in order to minimize premature switches. As illustrated in FIG. 14, after the system undergoes two premature switches, four power measurements are made. $P_2$ and $P_4$ are powers measured before the switches, and $P_3$ and $P_5$ afterward. Although the switches are unsuccessful, the next optimum switch point can now be estimated. In FIG. 14, a straight line can be found through $P_2$ and $P_4$, and another straight line through $P_3$ and $P_5$. The intersection of the two straight lines is the predicted switch point. The closer the two premature switches are to the optimum switch point, the more accurate the predicted switch point may be.

Figure 15:
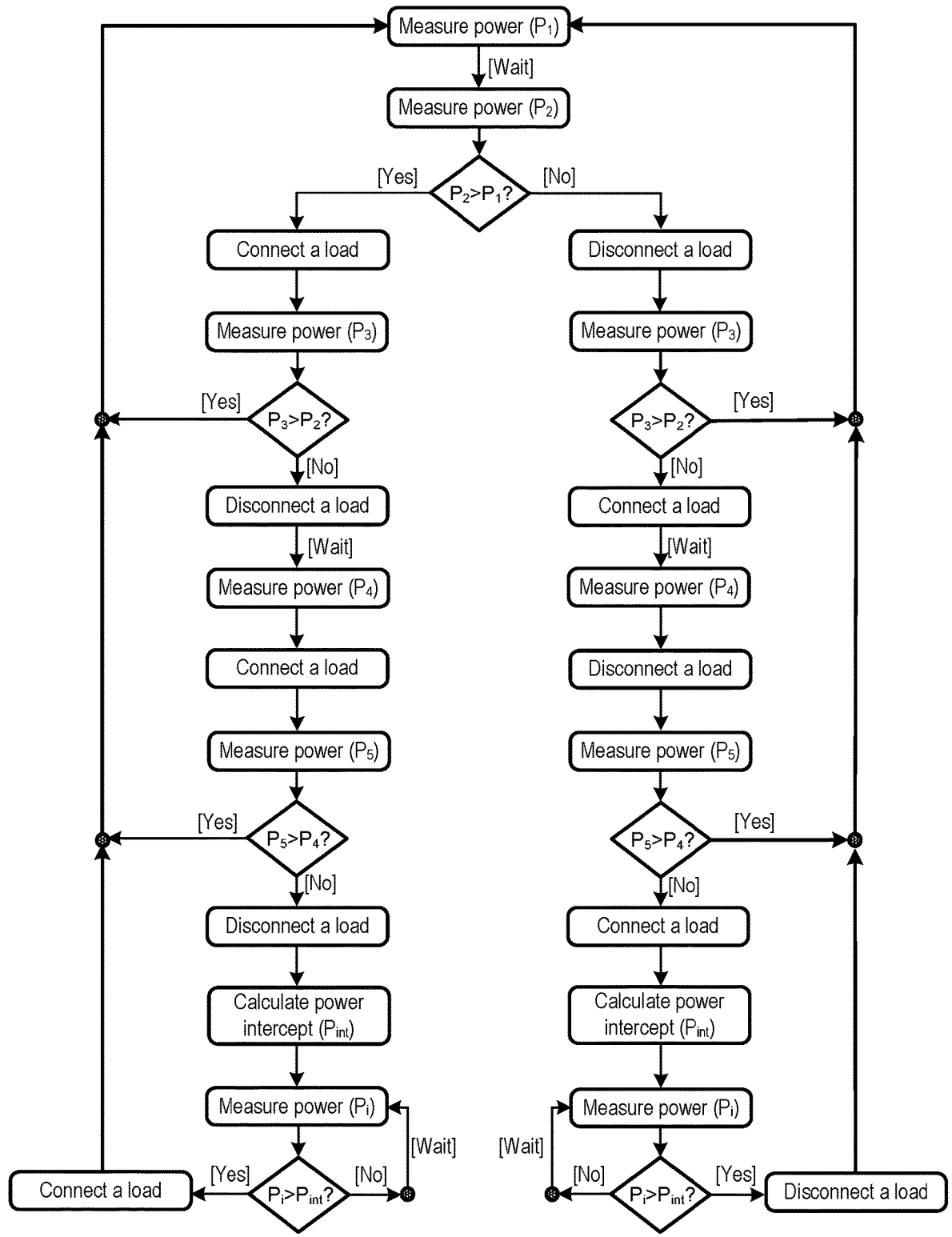
FIG. 15 illustrates a predictive algorithm for MPPT in a load-matching PV system, in accordance with various exemplary embodiments.

The block diagram for this predictive algorithm is shown in FIG. 15. First, it determines whether the irradiance is increasing or decreasing from the difference between two power measurements $P_2$ and $P_1$ and makes a decision regarding a switch (i.e., connection or disconnection of a load). In cases where the power after a switch is greater than before the switch, the system has found the optimum switch point. The system will keep the switched load, and the algorithm starts over. If the switch is found to be unsuccessful (i.e., $P_2$ is greater than $P_3$), it undoes the switch and tries again after a delay time $\Delta t$, resulting in two more power measurements $P_4$ and $P_5$. If $P_4$ is greater than $P_5$, the algorithm will predict the next optimum switch point through the following equations:

$$S_1 = \frac{P_4 - P_2}{\Delta t} \qquad (3)$$

$$S_2 = \frac{P_5 - P_3}{\Delta t} \qquad (4)$$

where $S_1$ and $S_2$ represent the slopes of the two straight lines through $P_2$ and $P_4$ and through $P_3$ and $P_5$, respectively. Using these two slopes, the predicted switch point can be calculated as:

$$P_{int} = S_1 \times \left( \frac{P_2 - P_3}{S_2 - S_1} \right) + P_2 \qquad (5)$$

where Pint is the intersection of the two straight lines, which is the predicted switch point.

Simulation and Experimental Results of Working Example

Both simulation and experiment were carried out to demonstrate the viability of the disclosed predictive algorithm on sunny and cloudy days.

Simulation Results

The simulation program for the load-matching system was developed in SIMULINK. It included a PV module, a controller, a power sensor, six relays, and six equal-resistance loads with the combined resistance selected to match the PV characteristic resistance under AM 1.5 irradiance. The selected module had a voltage ($V_{mpp}$) and current ($I_{mpp}$) of 31.74 V and 9.134 A at the maximum power point under standard test conditions (AM 1.5 and 25° C.), respectively. According to the equation (1), each load had a resistance of 20.85Ω. When six loads were connected in parallel to the PV module, the combined resistance matched the characteristic resistance of the PV module, $V_{mpp}/I_{mpp}$, or 3.475Ω. Both sunny and cloudy day irradiance profiles from the PV_Lib toolbox developed by Sandia National Laboratory were examined for the predictive algorithm disclosed herein. The selected PV module and irradiance profile had a maximum available energy of 2.19 kWh/day for the sunny day and 2.05 kWh/day for the cloudy day.

Figure 16:
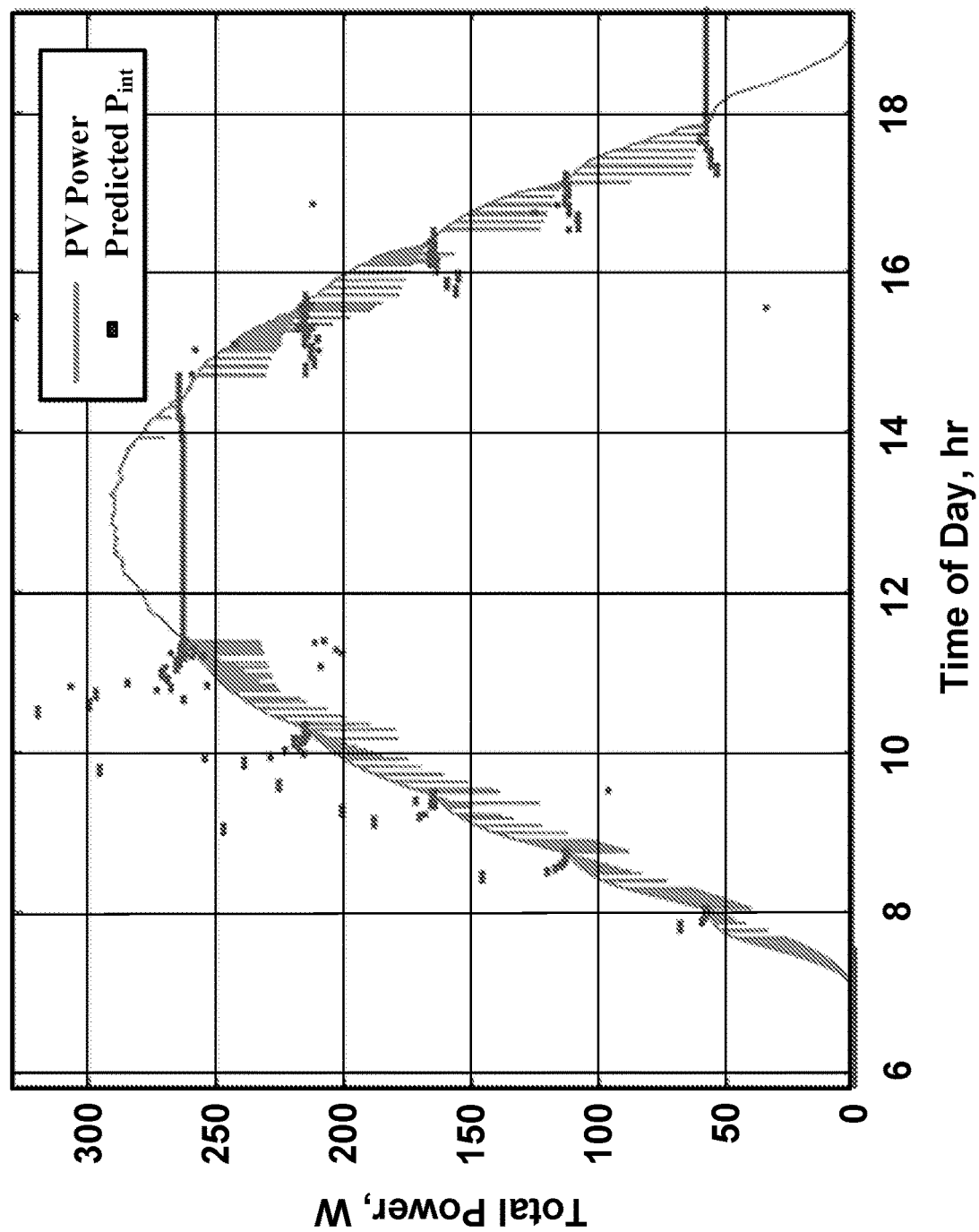
FIG. 16 illustrates power delivered and predicted switch points (Pint) using an unoptimized predictive algorithm with six equal loads on a sunny day, in accordance with various exemplary embodiments.
Figure 17:
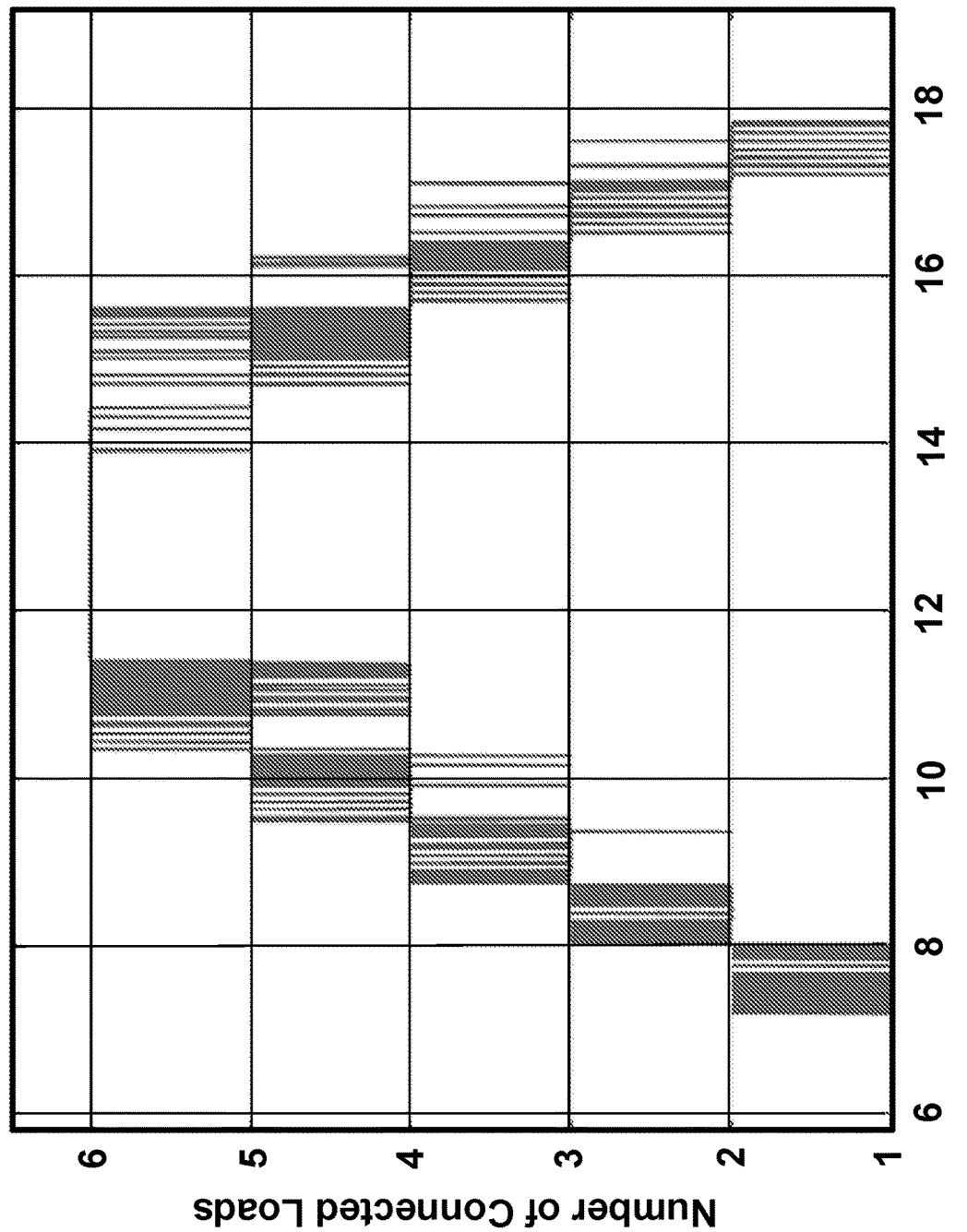
FIG. 17 illustrates the number of connected loads using an unoptimized predictive algorithm with six equal loads on a sunny day, in accordance with various exemplary embodiments.

FIGS. 16 and 17 show the simulation results for the first iteration of an unoptimized predictive algorithm on a sunny day. Table 2 included below lists the performance of the unoptimized predictive algorithm on a sunny day. Some faulty switches were observed. The y-axis in FIG. 16 was set to 0-330 W to display a clear picture of the irradiance profile. When zoomed in, many erroneously-predicted switch points were observed. Some of them were in the opposite direction of the current irradiance trend, some had negative power values, and some approached infinity.

Figure 18A:
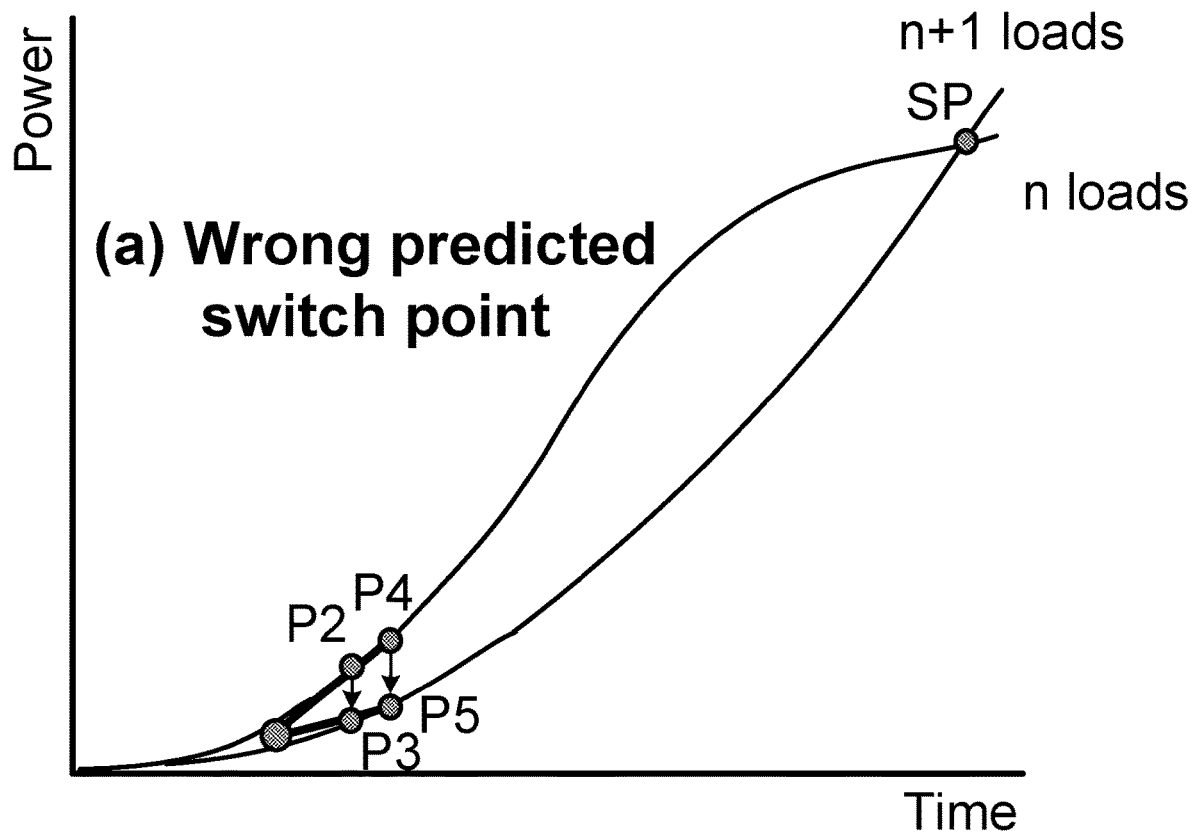
FIGS. 18A and 18B illustrate potential errors in estimation of an optimum switch point when two premature switches are, respectively, (a) far away from and (b) halfway to the next optimum switch point, in accordance with various exemplary embodiments.
Figure 18B:
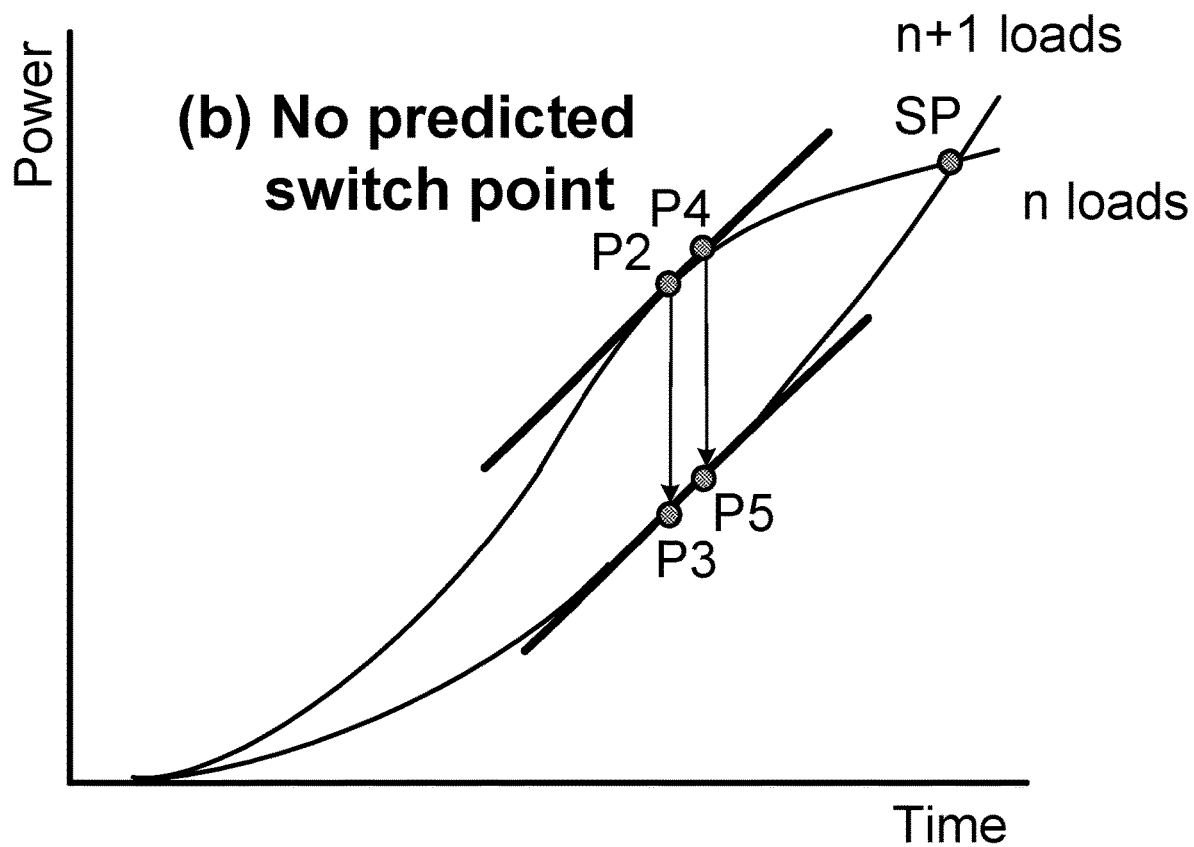

As discussed herein, the predicted switch point is more accurate when the two premature switches are closer to the optimum switch point. As shown in FIG. 18A, when the two premature switches are far away from the next optimum switch point, the predicted switch point is in the opposite direction of the current irradiance trend. When the two premature switches are half-way from the next optimum switch point, the predicted switch point may approach positive or negative infinity or beyond the power rating of the PV array, as shown in FIG. 18B. Both of these can be seen in FIG. 16, as erroneous predictions are concentrated right after an optimum switch point is just crossed and the next optimum switch point is still far away. Most of those predicted switch points are either negative or opposite of the current irradiance trend, causing the system to repetitively try to switch a load. This occurred throughout the day with the unoptimized predictive algorithm.

When the system moves close to the next optimum switch point, the predicted switch points converge to the optimum switch point. Therefore, some filtering can separate erroneous predictions from the correct predictions. The slopes calculated in the equations (3) and (4) can be used for this purpose. As shown in FIGS. 18A and 18B, the slope of n loads, $S_1$, is greater than or equal to that of n+1 loads, $S_2$, for erroneous predictions. In FIG. 18A, the previous optimum switch point has just been crossed, and the power gain by n loads, S1, is greater than n+1 loads, $S_2$. In FIG. 18B, the system is about halfway between two optimum switch points. At this moment, the two slopes, $S_1$ and $S_2$, are equal.

Therefore, the algorithm can select only those predictions for which $S_2$ is greater than $S_1$. When this condition is not met, the system can either wait for a delay time or for a threshold power change. The erroneous predictions are erased and recalibrated when the system moves close to the next optimum switch point. Only the correctly-predicted switch points are kept so the system can more effectively switch loads throughout the day.

Figure 19:
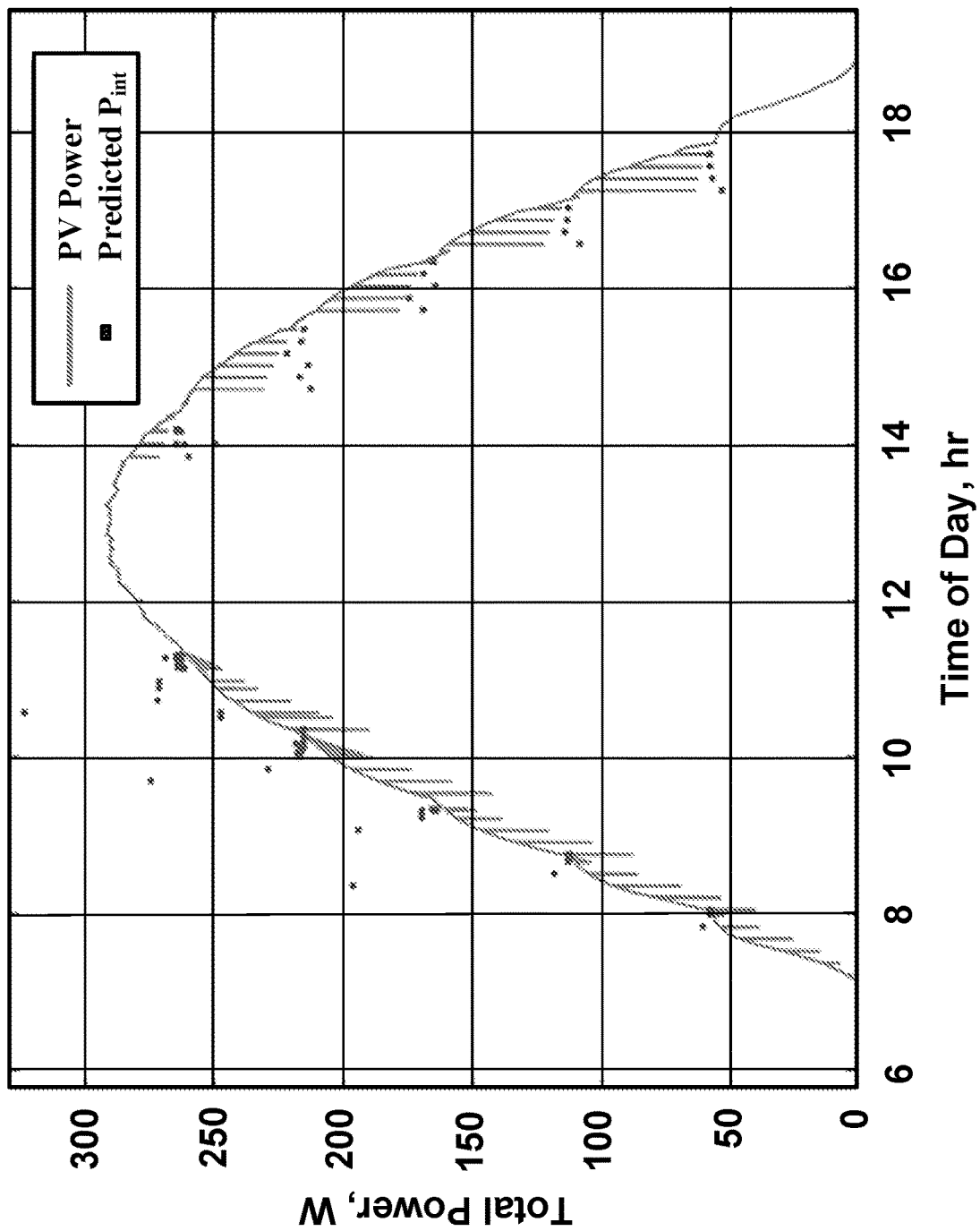
FIG. 19 illustrates power delivered and predicted switch points using an optimized predictive algorithm with six equal loads on a sunny day, in accordance with various exemplary embodiments.
Figure 20:
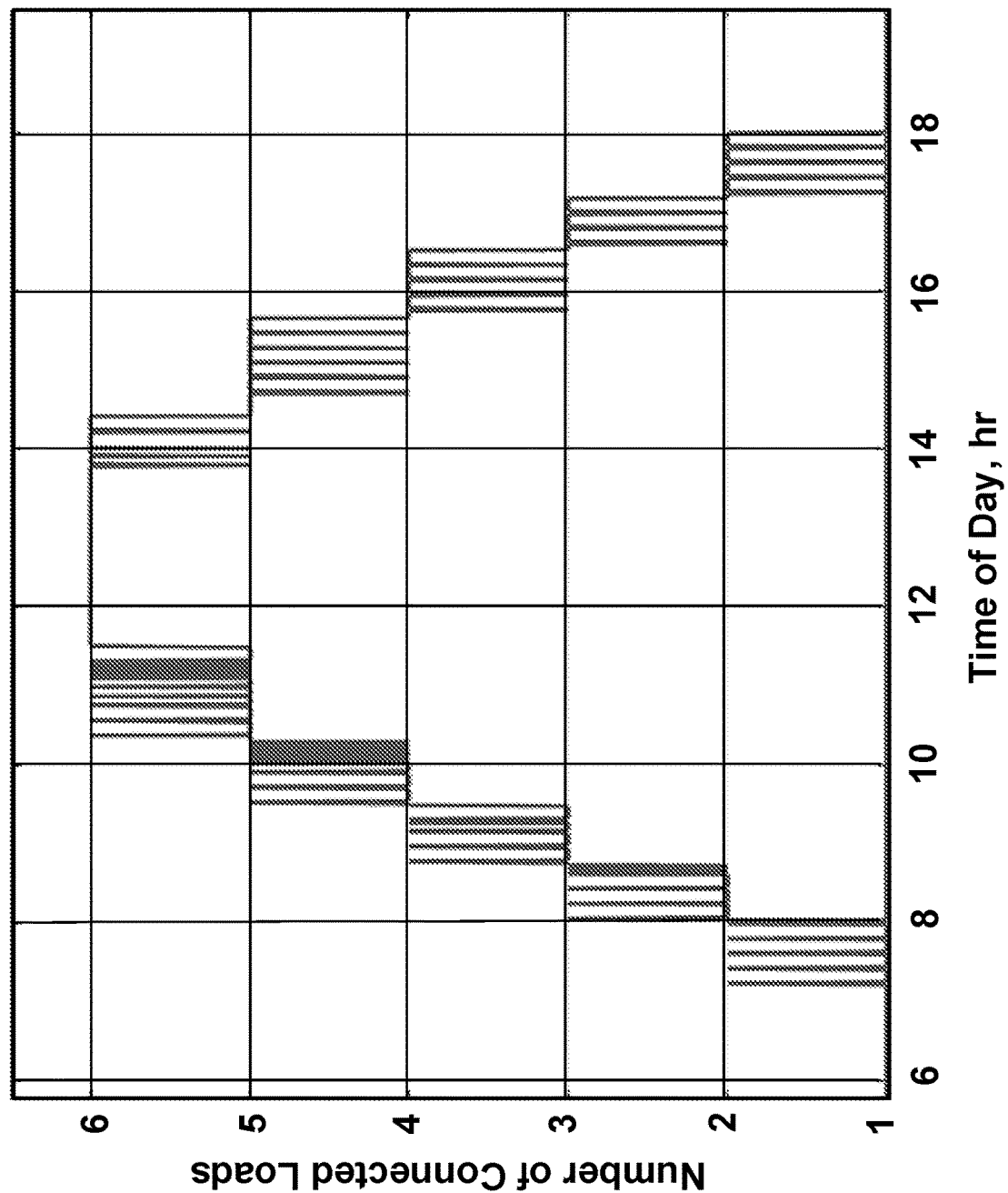
FIG. 20 illustrates the number of connected loads using an optimized predictive algorithm with six equal loads on a sunny day, in accordance with various exemplary embodiments.

The results illustrated in FIGS. 19 and 20 demonstrate that the predictive algorithm with slope filtering is successful in performing MPPT with far fewer switches than the unoptimized predictive algorithm and the optimized trial-and-error algorithm. The number of premature switches is significantly reduced when the system is far away from an optimum switch point. In fact, the optimized predictive algorithm had 500 fewer switches when compared to the optimized trial-and-error algorithm in FIGS. 10 and 11. Table 2 included below compares the performance of the optimized predictive algorithm with the unoptimized predictive algorithm on a sunny day. Despite far fewer switches, the optimized predictive algorithm is still able to perform MPPT, improving the system energy efficiency without additional cost. In FIGS. 19 and 20, most switches happen near optimum switch points, i.e., where the n load power curve and the n+1 power curve intersect. The total daily efficiency of the system was 98.01% for the selected module and/or 99.87% in reference to the maximum possible energy for a six-load system. This efficiency could be further increased with more loads.

The optimized predictive algorithm is also viable for performing MPPT during cloudy days. In general, the system may need a faster response time between two switches on cloudy days to follow the rapidly-changing irradiance conditions. The trial-and-error algorithm used different delay times between two power measurements for cloudy and sunny days to account for this. The delay time was shorter on cloudy days (10 seconds) and longer for sunny days (30 seconds). However, this is not necessary for the predictive algorithm since it already includes responses for changing irradiance conditions.

Figure 21:
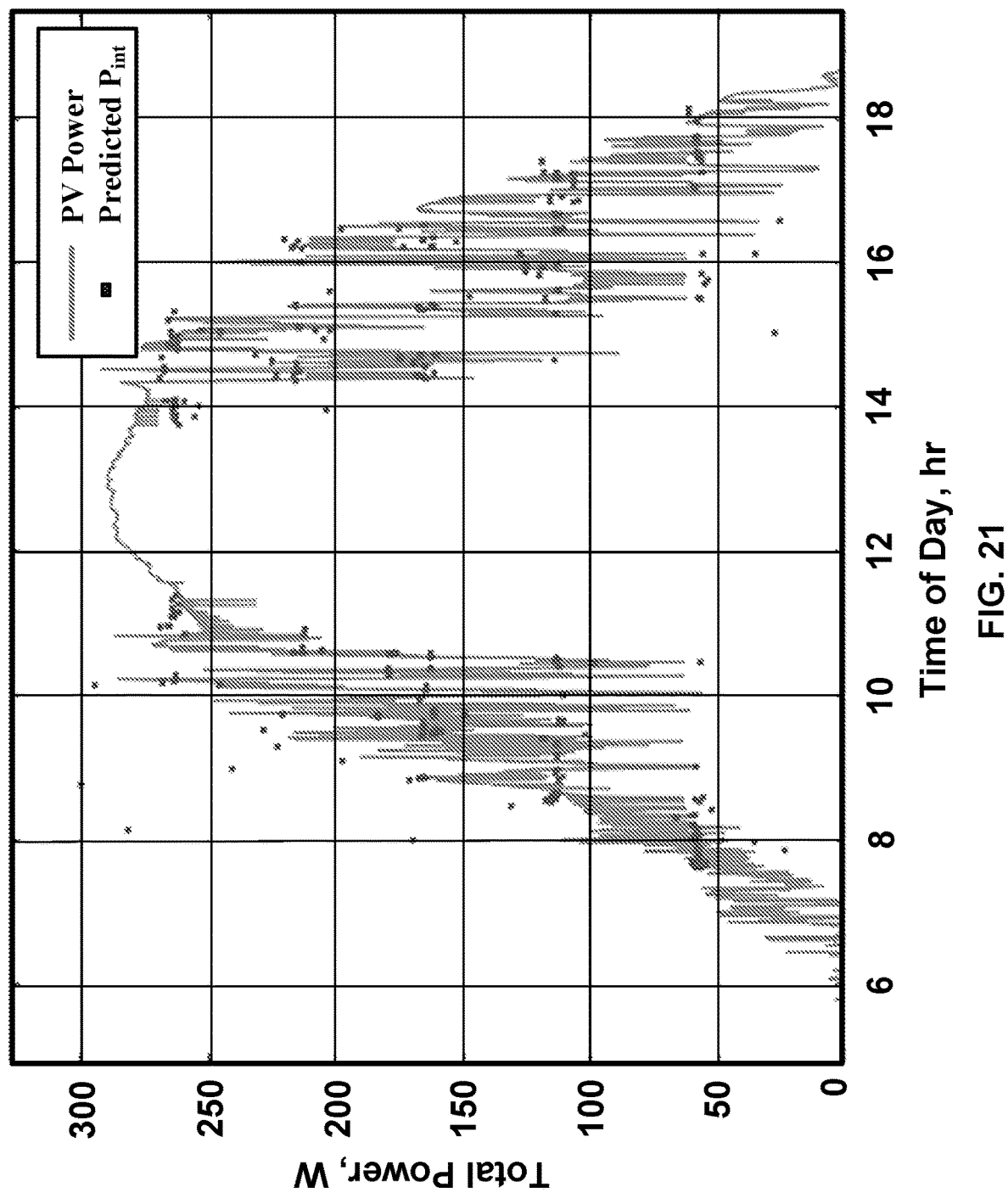
FIG. 21 illustrates power delivered and predicted switch points using an optimized predictive algorithm with six equal loads on a cloudy day, in accordance with various exemplary embodiments.
Figure 22:
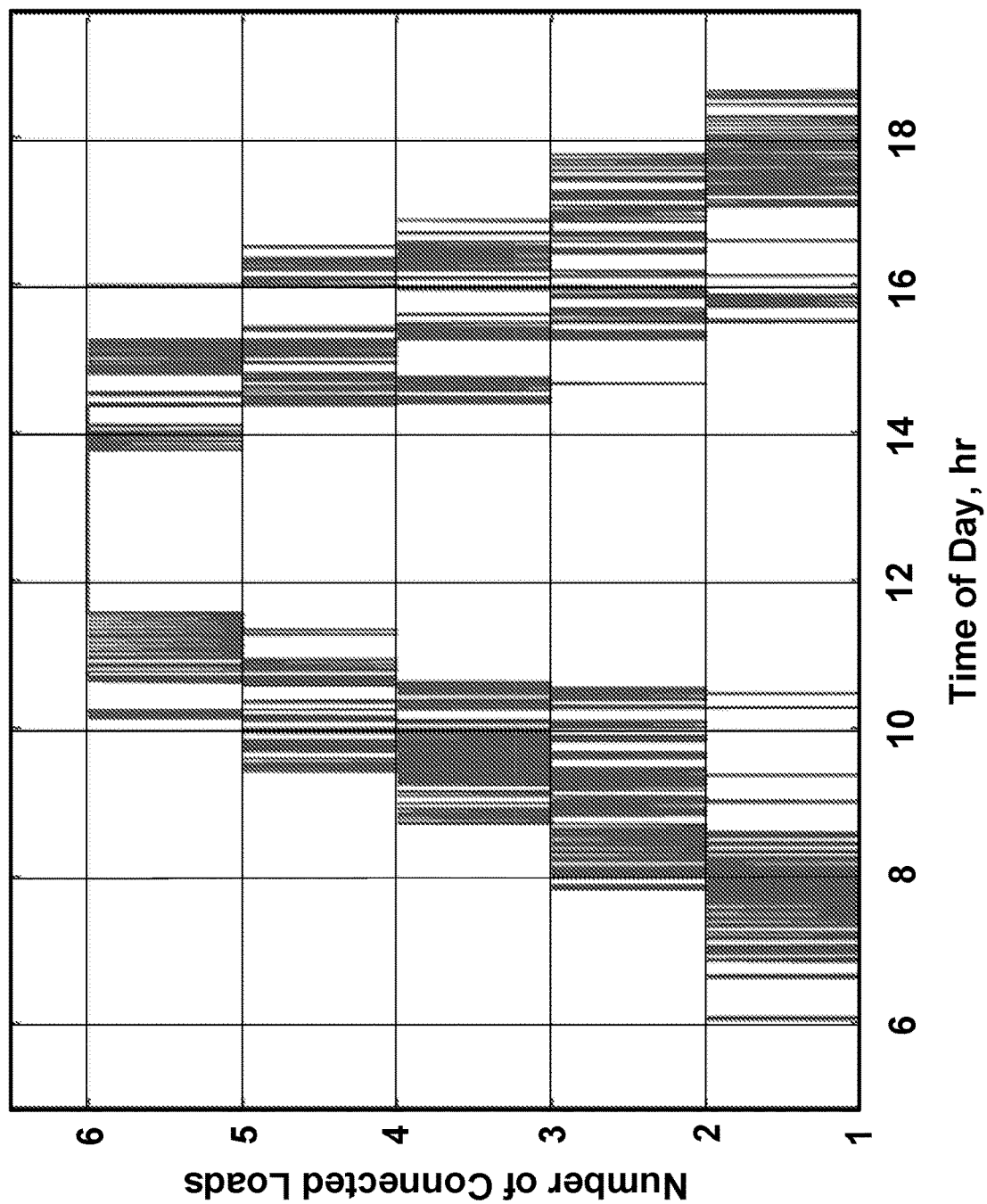
FIG. 22 illustrates the number of connected loads using an optimized predictive algorithm with six equal loads on a cloudy day, in accordance with various exemplary embodiments.

The power delivered to the loads and the number of loads connected using the optimized predictive algorithm on a cloudy day are presented in FIGS. 21 and 22, respectively. The algorithm successfully follows the maximum power point throughout the day despite the rapidly-changing irradiance conditions. Premature switches were reduced by 726 times, while the system energy efficiency improved by 0.4% compared to the optimized trial-and-error algorithm. The total daily efficiency of the system was 97.02% for the selected module and/or 98.87% in reference to the maximum possible energy for a six-load system on a cloudy day. In general, the predicted switch points were close to the optimum switch points. For example, at around 8 AM in FIG. 21, there is a sudden dip in irradiance level, which causes a predicted switch point to be below the optimum switch point. The system can understand this erroneous prediction since it differs too much from the current measured powers (e.g., more than a certain amount). The algorithm can disregard the erroneous predicted switch point and instead follow the rapidly-changing irradiance conditions.

TABLE 2

PERFORMANCE OF THE UNOPTIMIZED
AND OPTIMIZED PREDICTIVE
ALGORITHMS ON A SUNNY DAY

|  | Unoptimized Algorithm | Optimized Algorithm |
|---|---|---|
| Delay Time (s) | 10 | 10 |
| Power Threshold (%) | 2 | 2 |
| Number of Averaged Measurements | 350 | 350 |
| Total Number of Switches | 2196 | 270 |
| Total Energy Delivered (Wh) | 2138.6 | 2142.3 |

Experimental Results

To verify the predictive algorithm and simulation results, a proof-of-concept load-matching PV system was constructed. It used a silicon PV module of 140 Wp with a characteristic resistance of approximately 3Ω, a voltage sensor, a current sensor, an Allen-Bradley Pico 1760-L18BWB-EX programmable logic controller (PLC) with six built-in relays, and six resistive loads set around 18 Ω each. The constructed system included a batch of six 50-W variable resistors for the system's load, all powered by a PV module placed on a rooftop. A data-logging digital multimeter was used to take the current and voltage measurement and send it to the controller.

Figure 23:
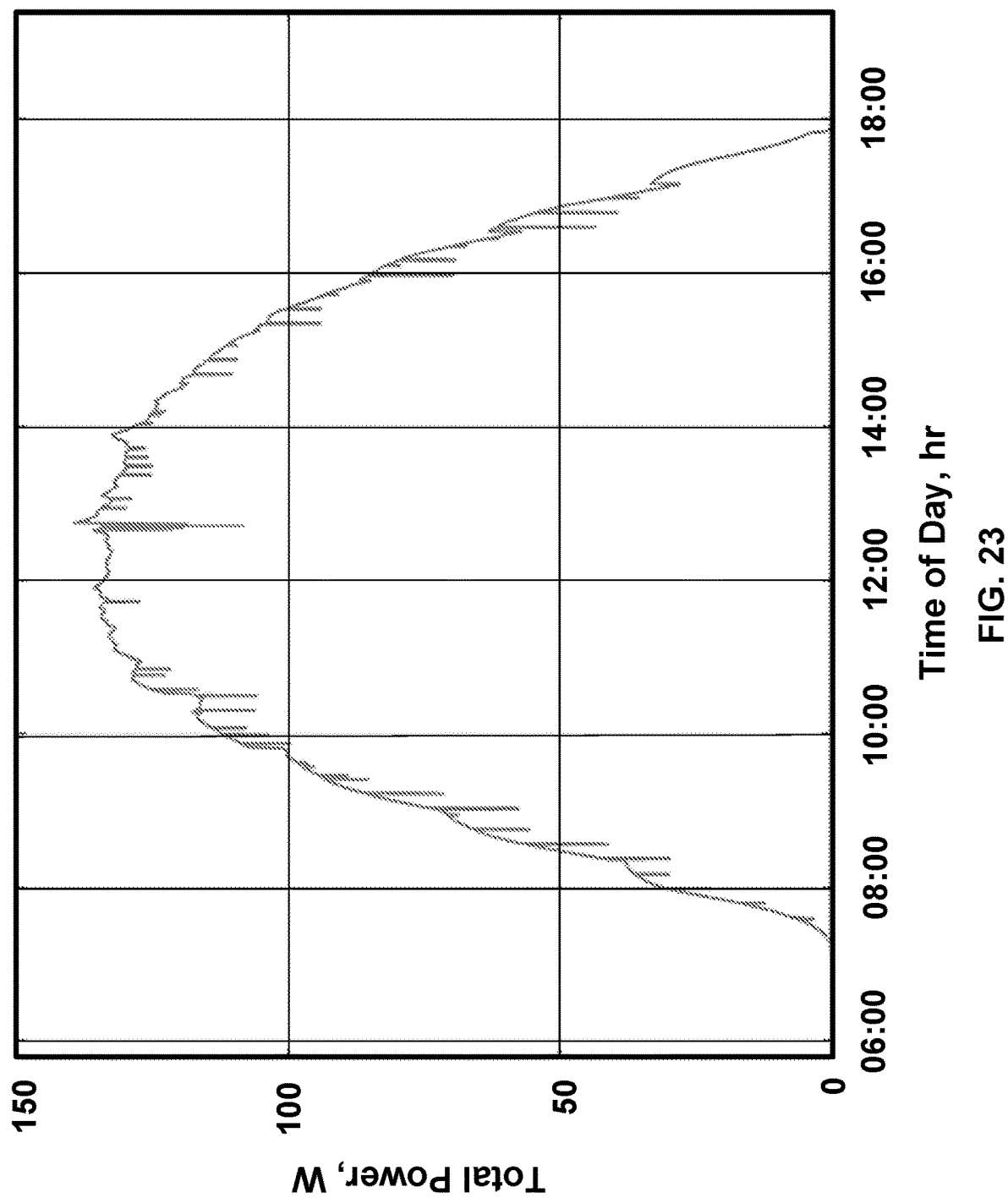
FIG. 23 illustrates measured power delivered using an optimized predictive algorithm with six equal loads on a sunny day, in accordance with various exemplary embodiments.
Figure 24:
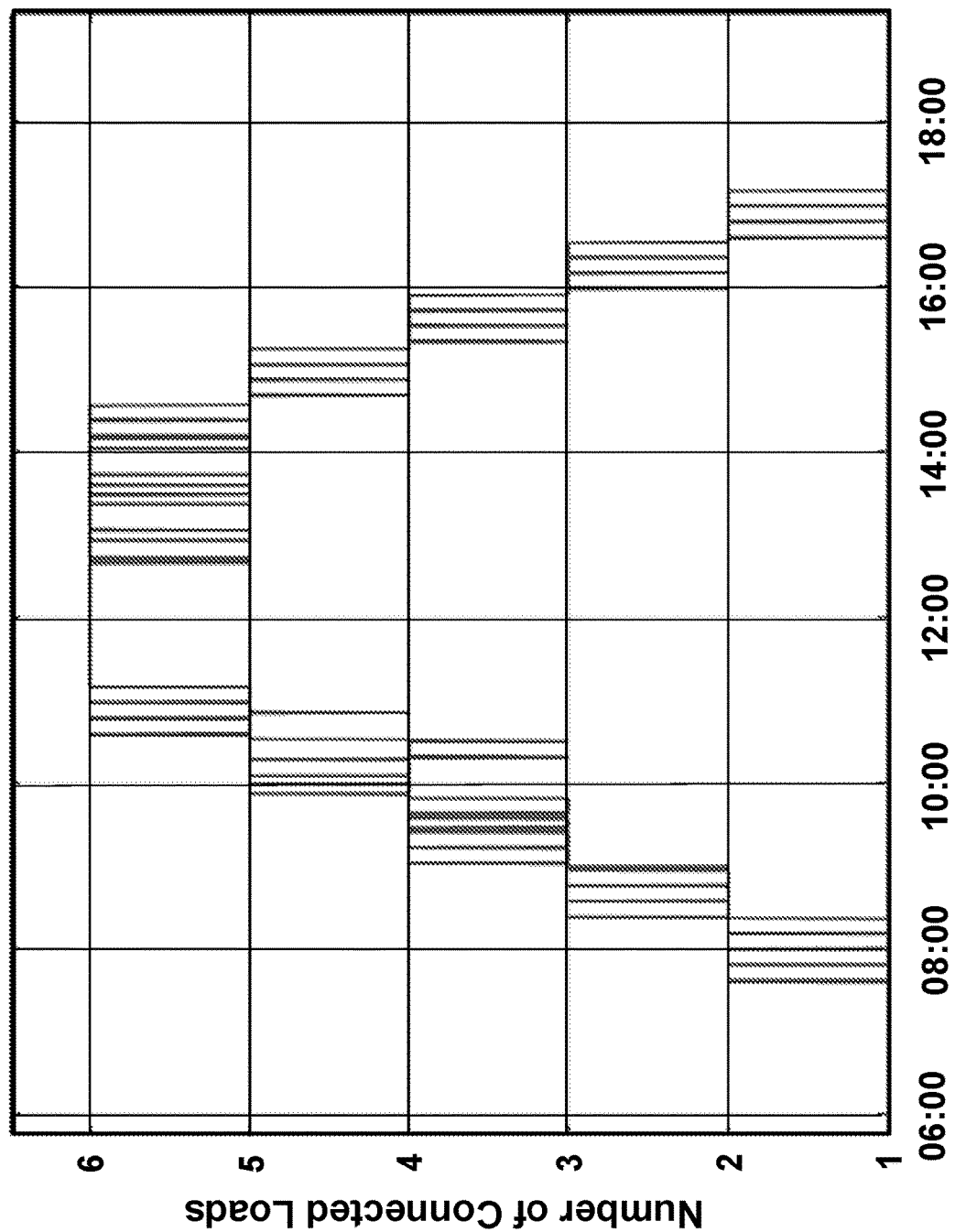
FIG. 24 illustrates the measured number of connected loads using an optimized predictive algorithm with six equal loads on a sunny day, in accordance with various exemplary embodiments.
Figure 25:
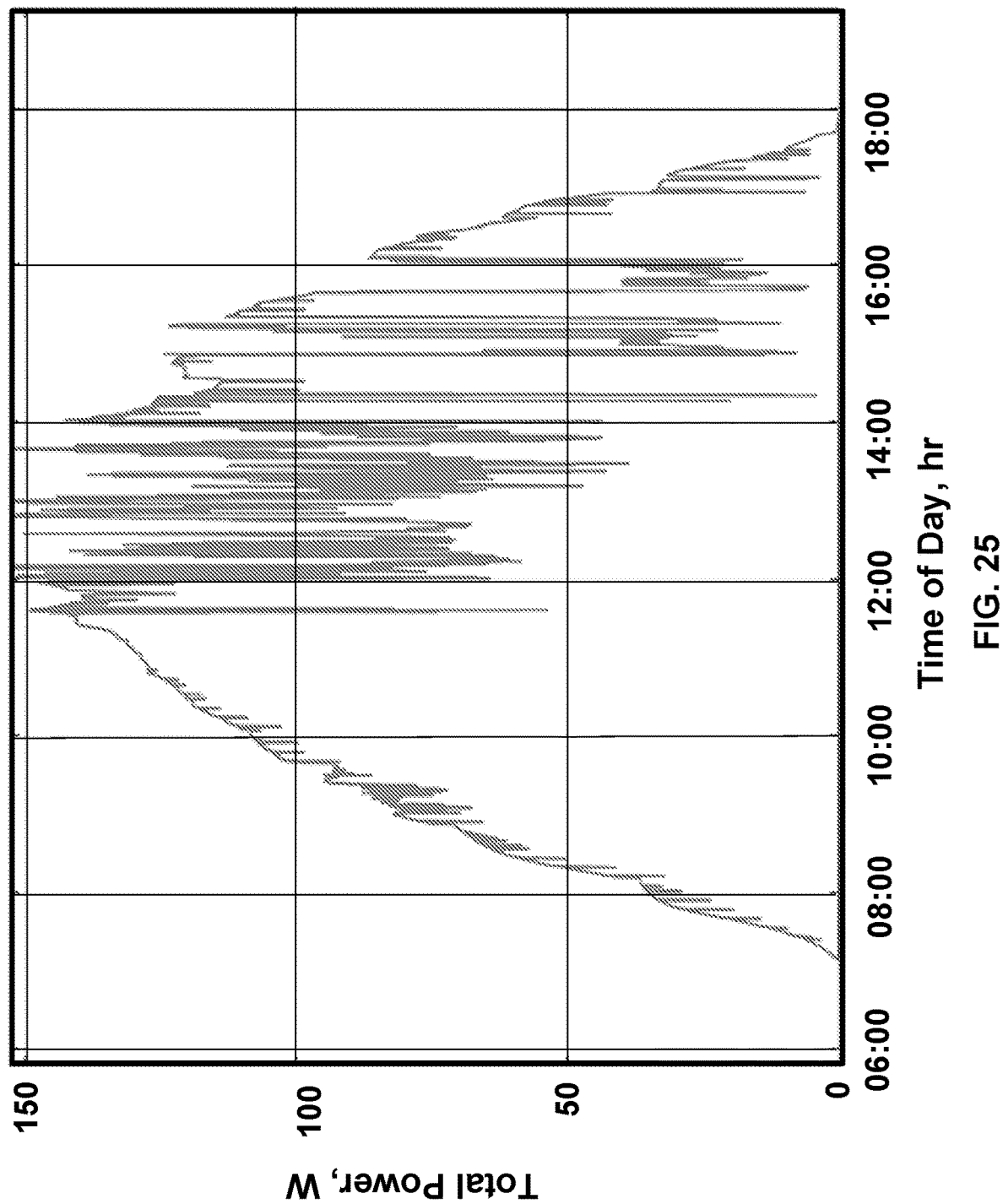
FIG. 25 illustrates measured power delivered using an optimized predictive algorithm with six equal loads on a cloudy day, in accordance with various exemplary embodiments.
Figure 26:
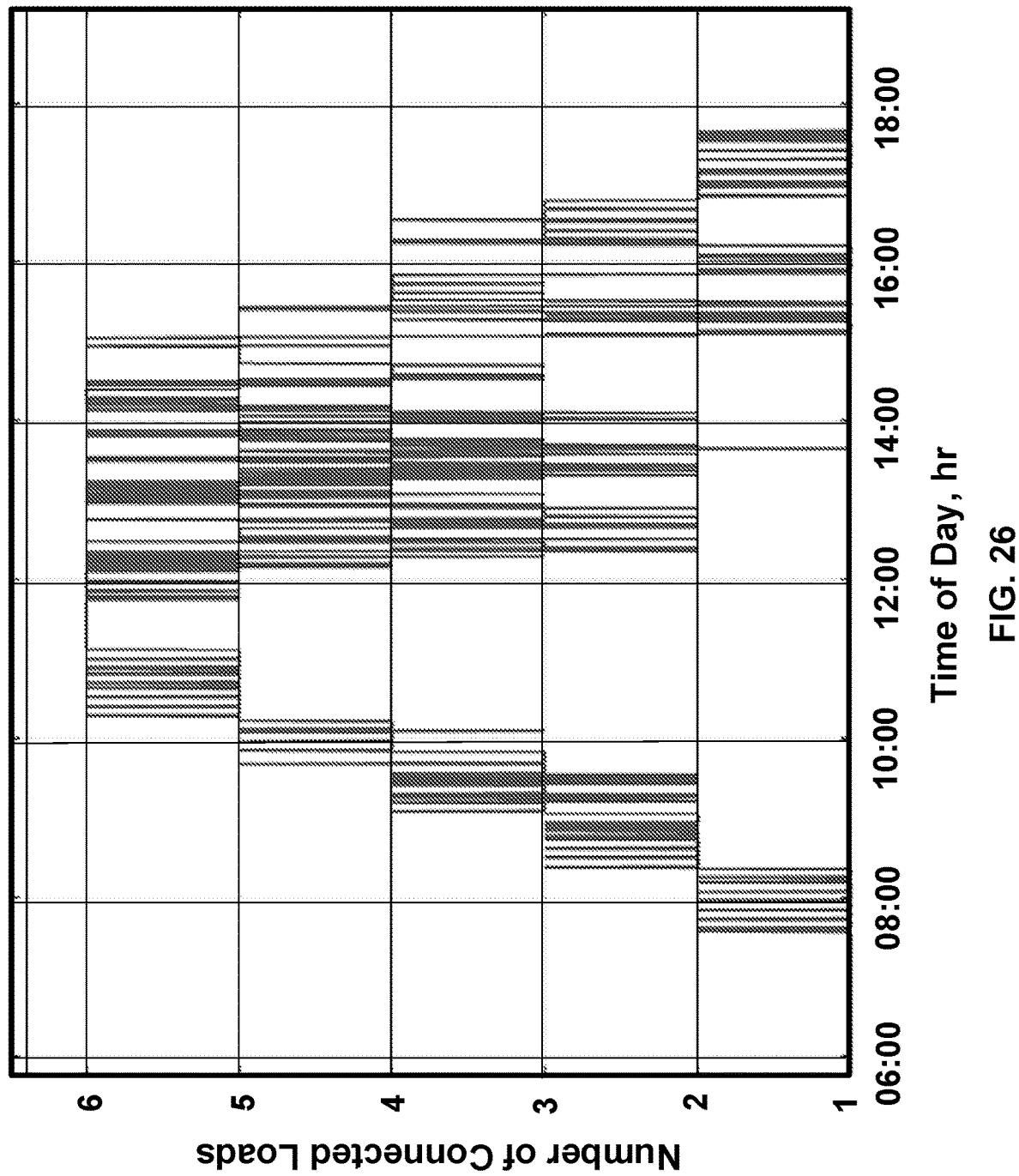
FIG. 26 illustrates the measured number of connected loads using an optimized predictive algorithm with six equal loads on a cloudy day, in accordance with various exemplary embodiments.

FIGS. 23 and 24 show the measured power delivered and the number of loads connected throughout a sunny day, and FIGS. 25 and 26 show the results on a cloudy day. The two experiments were conducted three days apart (with the solar angle being similar). While both experiments followed the irradiance profiles closely, the slightly-flattened cosine top as seen in FIG. 23 suggests a slight mismatch between the combined resistance of the six loads and the characteristic resistance of the PV module. This may be because aging and dust of the PV module have changed its characteristic resistance. When properly matched, the power curve should resemble more closely the simulation results in FIG. 19.

FIG. 23 shows the power delivered to the loads on a mostly sunny day. As the irradiance increases in the morning, the system connects more and more loads accordingly. The system responds to irradiance drops differently depending on the duration of the power drop. At around 11:45 AM, there is a brief drop of a few seconds in irradiance level possibly due to an airplane or a bird (see FIG. 23), but the system does not respond (see FIG. 24). However, when the irradiance drop lasts longer than a few seconds such as the one at around 12:40 PM (see FIG. 23), the system does respond by switching off Load 6 (see FIG. 24).

FIGS. 25 and 26 show the results of the system on a cloudy day. Significant shading starts after 11:00 AM, causing the PV power to swing widely. As the shade from clouds goes in and out, the predictive algorithm follows the irradiance profile by disconnecting and connecting loads throughout the day. It responds to rapidly-changing irradiance conditions in real time.

Application and Cost Analysis

Figure 27:
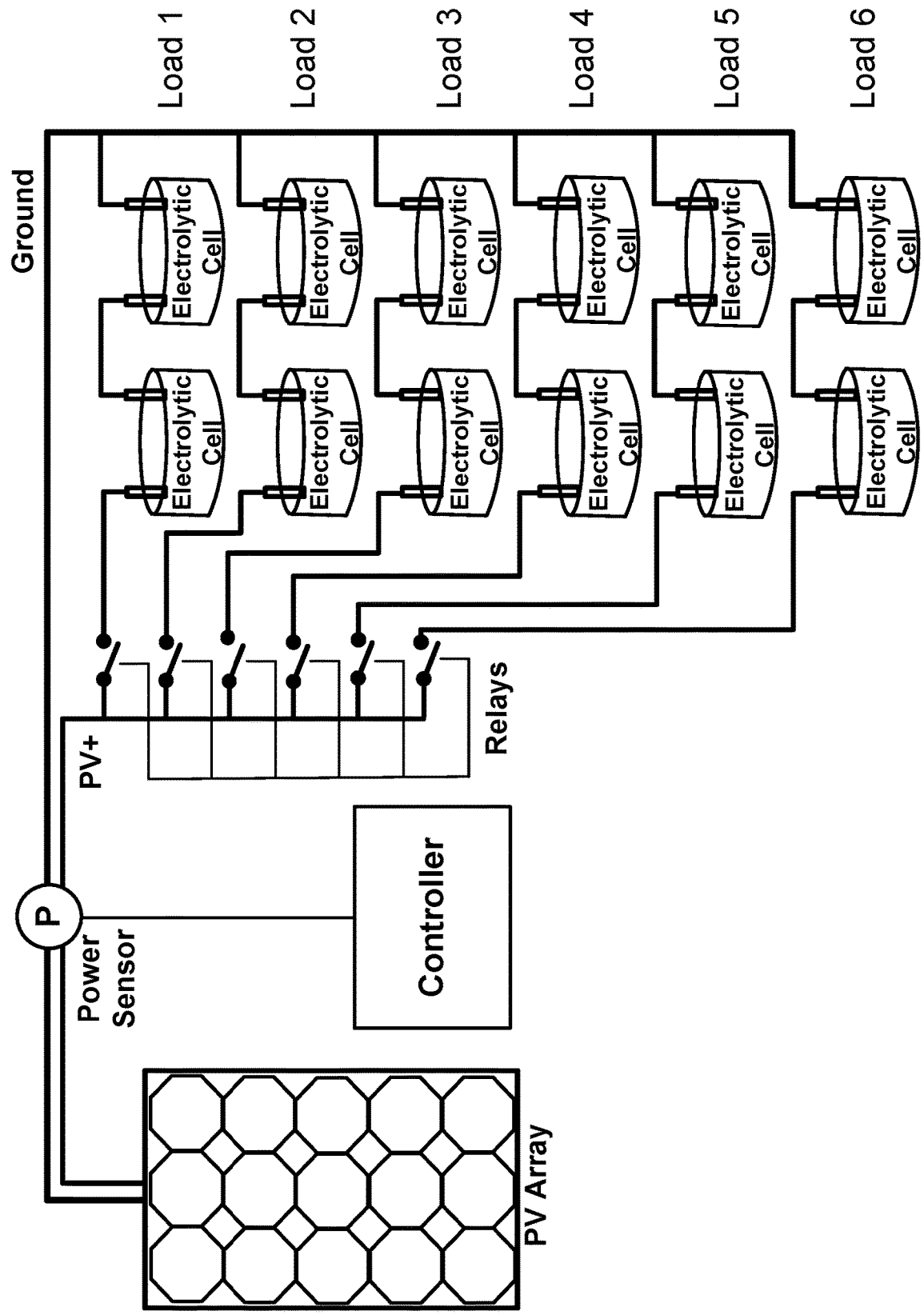
FIG. 27 illustrates a load-matching PV system with six electrolytic loads, in accordance with various exemplary embodiments.
Figure 28:
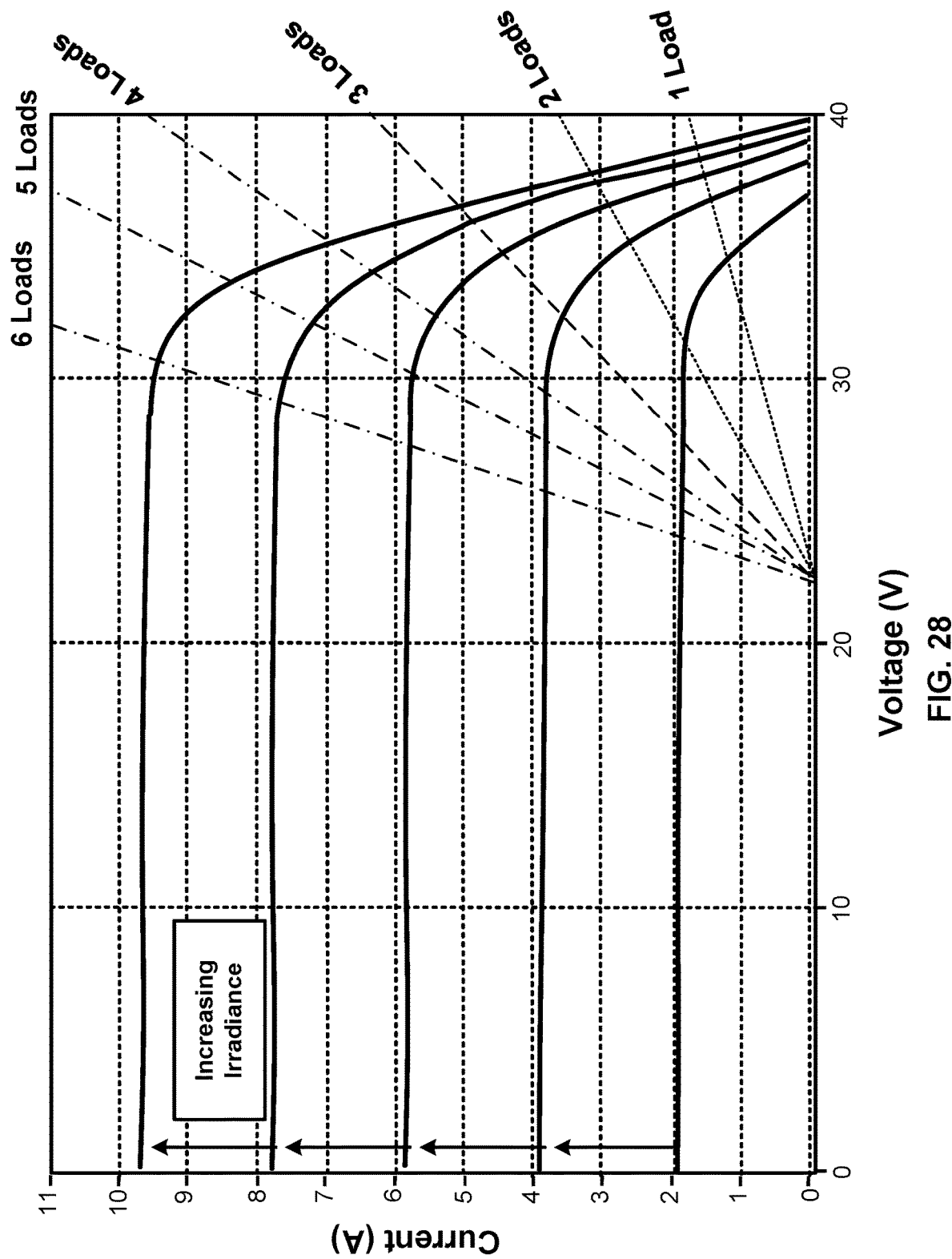
FIG. 28 illustrates load-line analysis for a load-matching PV system with six electrolytic loads, in accordance with various exemplary embodiments.

While there are several impactful applications for the load-matching PV system, the present disclosure focuses on resistive loads to highlight the conceptual benefits of the predictive algorithm. However, one of the ideal applications for the load-matching system described herein would be electrolytic loads. Electrolysis is widely used for the production and/or purification of materials in the chemical and metallurgical industry. Electrolytic loads for PV-powered hydrogen production were investigated and proved to be viable. FIG. 27 shows a load-matching PV system with six electrolytic loads. An equivalent circuit model for electrolytic loads can be represented by a diode with a threshold voltage in series with a resistor. This can be seen in FIG. 28. It revealed that the load-matching system delivers above 99% of the PV energy to the loads.

In addition to the increase in efficiency, the system electronics cost for load-matching systems is low in comparison to conventional systems. The system only requires one PLC controller, a microprocessor, a power sensor, and several relays. The cost of relays and power sensors are the only components that will scale depending on the size and adjustment of the system. The cost of a PLC controller, a microprocessor, relays, and other accessories is estimated to be under $0.02/$W_p$ for any load-matching system below 50 $kW_p$, approximately 1% of the total system cost. For utility-scale systems, it is estimated to be below $0.01/$W_p$. In comparison, the price of power converters for MPPT in conventional commercial PV systems (50 $kW_p$) in 2020 was over $0.20/$W_p$.

An intelligent predictive MPPT algorithm has been described herein for load-matching PV systems. The optimized predictive algorithm is able to perform MPPT on both sunny and cloudy days without the need for a conventional MPPT converter. Both simulation and experimental results showed that the optimized predictive algorithm significantly reduces the number of premature switches, thus improving the system's energy efficiency. The daily system efficiency using six loads was 98.01%, an improvement over conventional P&O methods, and can increase with more loads. The key to the success of the algorithm is its ability to estimate the optimum switch point based on two consecutive premature switches. The performance of the disclosed algorithm was compared to the trial-and-error algorithm as well as conventional MPPT algorithms. The load-matching PV system along with the intelligent predictive algorithm uses no power converter, and its associated cost and power loss are eliminated. The cost of the electronics associated with this technique is less than 1% of a PV system's total cost, estimated to be under $0.02/$W_p$. It significantly improves the reliability, scalability, and energy efficiency of the system over traditional PV systems with power converters for MPPT.

In some exemplary embodiments, the intelligent predictive algorithm described herein and the related system may include software operating on a general-purpose microprocessor.

While the principles of this disclosure have been shown in various exemplary embodiments, many modifications of structure, arrangements, proportions, the elements, materials and components, used in practice, which are particularly adapted for a specific environment and operating requirements, may be used without departing from the principles and scope of this disclosure. These and other changes or modifications are intended to be included within the scope of the present disclosure and may be expressed in the following claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of any embodiment. In the claims, reference to an element in the singular is not intended to mean "one and only one" unless explicitly so stated, but rather "one or more."

Systems, methods and apparatus are provided herein. In the detailed description herein, references to "various exemplary embodiments", "one embodiment", "an embodiment", "an exemplary embodiment", etc. indicate that the embodiment described may include a particular feature, structure, or characteristic, but every embodiment may not necessarily include the particular feature, structure, or characteristic. Moreover, such phrases are not necessarily referring to the same embodiment. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

What is claimed is:

1. A load management system for a solar photovoltaic (PV) system, the system comprising:
    a PV array of solar modules;
    a plurality of loads configured to be powered by the PV array and switched on or off by a plurality of respective relays;
    a power sensor configured to measure an amount of power delivered from the PV array to the plurality of loads; and
    a controller coupled to the power sensor and the plurality of relays and configured to:
        determine, by the power sensor, a first power output and a second power output of the PV array at, respectively, a first time and a second time which is later than the first time by a first delay period;
        compare the first and the second power outputs;
        cause, via a relay and based on the comparison of the first and the second power outputs, a first switch of a load;
        determine, by the power sensor, a third power output of the PV array at a third time after the first switch of the load and compare the second and the third power outputs;
        cause, via the relay and based on the comparison of the second and the third power outputs, an undo of the first switch of the load if the second power output is larger than the third power output;
        determine, by the power sensor, a fourth power output of the PV array at a fourth time after the undo of the first switch of the load and a second delay period;
        cause, via the relay, a second switch of the load;
        determine, by the power sensor, a fifth power output of the PV array at a fifth time after the second switch of the load and compare the fourth and the fifth power outputs;
        cause, via the relay and based on the comparison of the fourth and the fifth power outputs, an undo of the second switch of the load if the fourth power output is larger than the fifth power output;
        determine a first rate of change of power output between the second and the fourth power outputs and a second rate of change of power output between the third and the fifth power outputs;
        predict, based on the first and the second rates of change of power output, a power output level of the PV array at a sixth time corresponding to an optimal power level for a third switch of the load; and
        cause, via the relay, the third switch of the load when a measured power output level of the PV array equals the predicted power output level.

2. The system of claim 1, wherein the first switch, the second switch, or the third switch of the load comprises a connection of the load to the PV array.

3. The system of claim 1, wherein the first switch, the second switch, or the third switch of the load comprises a disconnection of the load from the PV array.

4. The system of claim 1, wherein the first delay period between the first time and the second time and the second delay period between the third time and the fourth time are each between 1 second and 10 minutes.

5. The system of claim 1, wherein the controller is further configured to prevent, based on the first delay period between the first time and the second time and the second delay period between the third time and the fourth time, a faulty switch of a load caused by noise in solar irradiance data associated with the PV array.

6. The system of claim 1, wherein the controller is further configured to cause, via one or more additional relays, connection of one or more additional loads to the PV array and to handle a peak power output of a gigawatt.

7. The system of claim 1, wherein the controller is further configured for industrial electrolysis, solar energy storage, or electric vehicle charging.

8. A load management apparatus for a solar photovoltaic (PV) system, the apparatus comprising:
a PV array of solar modules;
a plurality of loads configured to be powered by the PV array and switched on or off by a plurality of respective relays;
a power sensor configured to measure an amount of power delivered from the PV array to the plurality of loads; and
a controller coupled to the power sensor and the plurality of relays and configured to:
determine, by the power sensor, a first power output and a second power output of the PV array at, respectively, a first time and a second time which is later than the first time by a first delay period;
compare the first and the second power outputs;
cause, via a relay and based on the comparison of the first and the second power outputs, a first switch of a load;
determine, by the power sensor, a third power output of the PV array at a third time after the first switch of the load and compare the second and the third power outputs;
cause, via the relay and based on the comparison of the second and the third power outputs, an undo of the first switch of the load if the second power output is larger than the third power output;
determine, by the power sensor, a fourth power output of the PV array at a fourth time after the undo of the first switch of the load and a second delay period;
cause, via the relay, a second switch of the load;
determine, by the power sensor, a fifth power output of the PV array at a fifth time after the second switch of the load and compare the fourth and the fifth power outputs;
cause, via the relay and based on the comparison of the fourth and the fifth power outputs, an undo of the second switch of the load if the fourth power output is larger than the fifth power output;
determine a first rate of change of power output between the second and the fourth power outputs and a second rate of change of power output between the third and the fifth power outputs;
predict, based on the first and the second rates of change of power output, a power output level of the PV array at a sixth time corresponding to an optimal power level for a third switch of the load; and
cause, via the relay, the third switch of the load when a measured power output level of the PV array equals the predicted power output level.

9. The apparatus of claim 8, wherein the first switch, the second switch, or the third switch of the load comprises a connection of the load to the PV array.

10. The apparatus of claim 8, wherein the first switch, the second switch, or the third switch of the load comprises a disconnection of the load from the PV array.

11. The apparatus of claim 8, wherein the first delay period between the first time and the second time and the second delay period between the third time and the fourth time are each between 1 second and 10 minutes.

12. The apparatus of claim 8, wherein the controller is further configured to prevent, based on the first delay period between the first time and the second time and the second delay period between the third time and the fourth time, a faulty switch of a load caused by noise in solar irradiance data associated with the PV array.

13. The apparatus of claim 8, wherein the controller is further configured to cause, via one or more additional relays, connection of one or more additional loads to the PV array and to handle a peak power output of a gigawatt.

14. The apparatus of claim 8, wherein the controller is further configured for industrial electrolysis, solar energy storage, or electric vehicle charging.

15. A load management method for a solar photovoltaic (PV) system, the method comprising:
determining, by a power sensor, a first power output and a second power output of a PV array of solar modules at, respectively, a first time and a second time which is later than the first time by a first delay period;
comparing, by a controller, the first and the second power outputs;
causing, via a relay and based on the comparison of the first and the second power outputs, a first switch of a load;
determining, by the power sensor, a third power output of the PV array at a third time after the first switch of the load and comparing, by the controller, the second and the third power outputs;
causing, via the relay and based on the comparison of the second and the third power outputs, an undo of the first switch of the load based on the second power output being larger than the third power output;
determining, by the power sensor, a fourth power output of the PV array at a fourth time after the undo of the first switch of the load and a second delay period;
causing, via the relay, a second switch of the load;
determining, by the power sensor, a fifth power output of the PV array at a fifth time after the second switch of the load and comparing, by the controller, the fourth and the fifth power outputs;
causing, via the relay and based on the comparison of the fourth and the fifth power outputs, an undo of the second switch of the load based on the fourth power output being larger than the fifth power output;
determining, by the controller, a first rate of change of power output between the second and the fourth power outputs and a second rate of change of power output between the third and the fifth power outputs; and
predicting, by the controller and based on the first and the second rates of change of power output, a power output level of the PV array at a sixth time corresponding to an optimal power level for a third switch of the load.

16. The method of claim 15, wherein the first switch, the second switch, or the third switch of the load comprises a connection of the load to the PV array.

17. The method of claim 15, wherein the first switch, the second switch, or the third switch of the load comprises a disconnection of the load from the PV array.

18. The method of claim 15, wherein the first delay period between the first time and the second time and the second delay period between the third time and the fourth time are each between 1 second and 10 minutes.

19. The method of claim 15, further comprising preventing, by the controller and based on the first delay period between the first time and the second time and the second delay period between the third time and the fourth time, a faulty switch of a load caused by noise in solar irradiance data associated with the PV array.

20. The method of claim 15, further comprising causing, via one or more additional relays, connection of one or more additional loads to the PV array and handling a peak power output of a gigawatt.

\* \* \* \* \*